United States Patent
Kim et al.

(10) Patent No.: US 10,367,629 B2
(45) Date of Patent: Jul. 30, 2019

(54) METHOD FOR ESTIMATING, BY DEVICE USING FDR SCHEME, NON-LINEAR SELF-INTERFERENCE SIGNAL CHANNEL

(71) Applicant: LG ELECTRONICS INC., Seoul (KR)

(72) Inventors: Dongkyu Kim, Seoul (KR); Hyunsoo Ko, Seoul (KR); Kilbom Lee, Seoul (KR); Kukheon Choi, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 15/543,950

(22) PCT Filed: Jan. 22, 2016

(86) PCT No.: PCT/KR2016/000703
§ 371 (c)(1),
(2) Date: Jul. 14, 2017

(87) PCT Pub. No.: WO2016/117961
PCT Pub. Date: Jul. 28, 2016

(65) Prior Publication Data
US 2018/0026773 A1 Jan. 25, 2018

Related U.S. Application Data

(60) Provisional application No. 62/126,723, filed on Mar. 2, 2015, provisional application No. 62/115,653, filed
(Continued)

(51) Int. Cl.
*H04L 5/14* (2006.01)
*H04L 27/26* (2006.01)
(Continued)

(52) U.S. Cl.
CPC .............. *H04L 5/14* (2013.01); *H04B 15/00* (2013.01); *H04L 25/0202* (2013.01);
(Continued)

(58) Field of Classification Search
CPC ... H04L 5/14; H04L 25/0226; H04L 25/0202; H04L 27/26; H04B 15/00; H04W 84/045
See application file for complete search history.

(56) References Cited

U.S. PATENT DOCUMENTS

2003/0026199 A1* 2/2003 Myers .................. H04J 13/004
370/208
2011/0149714 A1 6/2011 Rimini et al.
(Continued)

FOREIGN PATENT DOCUMENTS

KR 1020100021383 2/2010

OTHER PUBLICATIONS

PCT International Application No. PCT/KR2016/000703, Written Opinion of the International Searching Authority dated Jun. 3, 2016, 22 pages.
(Continued)

*Primary Examiner* — Steven H Nguyen
(74) *Attorney, Agent, or Firm* — Lee Hong Degerman Kang & Waimey

(57) ABSTRACT

A method for estimating, by a device using an FDR scheme, a non-linear self-interference signal channel comprises a step of estimating a non-linear self-interference signal channel using a first sequence set included in a predefined first sequence set, wherein the predefined first sequence set is defined in consideration of non-linear self-interference signal components in an RF transmission chain and an RF reception chain of the device.

14 Claims, 17 Drawing Sheets

Related U.S. Application Data on Feb. 13, 2015, provisional application No. 62/106,797, filed on Jan. 23, 2015.

(51) Int. Cl.
    *H04B 15/00*         (2006.01)
    *H04L 25/02*         (2006.01)
    *H04W 84/04*        (2009.01)

(52) U.S. Cl.
    CPC .......... *H04L 25/0226* (2013.01); *H04L 27/26* (2013.01); *H04W 84/045* (2013.01)

(56) References Cited

U.S. PATENT DOCUMENTS

| | | |
|---|---|---|
| 2013/0301487 A1 | 11/2013 | Khandani |
| 2013/0315321 A1 | 11/2013 | Rajagopal et al. |
| 2015/0043323 A1* | 2/2015 | Choi ........................ H04L 5/143 370/203 |
| 2015/0341157 A1* | 11/2015 | Eltawil ................ H04L 5/1453 370/278 |
| 2016/0183100 A1* | 6/2016 | Xue ........................ H04W 24/02 370/252 |
| 2016/0226653 A1* | 8/2016 | Bharadia ................ H04B 1/525 |
| 2017/0155496 A1* | 6/2017 | Khandani ................ H04L 5/14 |
| 2017/0187513 A9* | 6/2017 | Bharadia ................ H04L 5/1461 |

OTHER PUBLICATIONS

Korpi, D. et al., "Reference Receiver Based Digital Self-Interference Cancellation in MIMO Full-Duplex Transceivers," IEEE Globecom Workshops, DOI: 10.1109/GLOCOMW.2014.7063564, Dec. 2014, 7 pages.

* cited by examiner

FIG. 14

| Sequence Set | 1st (u) | 2nd (2u) | 3rd (3u) | 4th (4u) | 5th (5u) | 6th (6u) | 7th (7u) | 9th (9u) |
|---|---|---|---|---|---|---|---|---|
| Set 1 | 1 | 2 | 3 | 4 | 5 | 6 | 7 | 9 |
| Set 2 | 4 | 8 | 12 | 16 | 20 | 24 | 28 | 36 |
| Set 3 | 5 | 10 | 15 | 20 | 25 | 30 | 35 | 45 |
| Set 4 | 7 | 14 | 21 | 28 | 35 | 42 | 49 | 63 |
| Set 5 | 9 | 18 | 27 | 36 | 45 | 54 | 63 | 10 |
| Set 6 | 11 | 22 | 33 | 44 | 55 | 66 | 6 | 28 |
| Set 7 | 13 | 26 | 39 | 52 | 65 | 7 | 20 | 46 |
| Set 8 | 16 | 32 | 48 | 64 | 9 | 25 | 41 | 2 |
| Set 9 | 17 | 34 | 51 | 68 | 14 | 31 | 48 | 11 |
| Set 10 | 19 | 38 | 57 | 5 | 24 | 43 | 62 | 29 |
| Set 11 | 20 | 40 | 60 | 9 | 29 | 49 | 69 | 38 |
| Set 12 | 23 | 46 | 69 | 21 | 44 | 67 | 19 | 65 |
| Set 13 | 59 | 47 | 35 | 23 | 11 | 70 | 58 | 34 |
| Set 14 | 62 | 53 | 44 | 35 | 26 | 17 | 8 | 61 |
| Set 15 | 66 | 61 | 56 | 51 | 46 | 41 | 36 | 26 |

METHOD FOR ESTIMATING, BY DEVICE USING FDR SCHEME, NON-LINEAR SELF-INTERFERENCE SIGNAL CHANNEL

CROSS-REFERENCE TO RELATED APPLICATIONS

This application is the National Stage filing under 35 U.S.C. 371 of International Application No. PCT/KR2016/000703, filed on Jan. 22, 2016, which claims the benefit of U.S. Provisional Application Nos. 62/106,797, filed on Jan. 23, 2015, 62/115,653, filed on Feb. 13, 2015, and 62/126,723, filed on Mar. 2, 2015, the contents of which are all hereby incorporated by reference herein in their entirety.

TECHNICAL FIELD

The present invention relates to wireless communication and, more particularly, to a method of estimating a non-linear self-interference signal channel at a device using an FDR scheme.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-Device Self-Interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference: An Uplink (UL) signal transmitted by a UE is received at an adjacent UE and thus serves as interference.

BS to BS Inter-Link Interference: The BS to BS inter-link interference refers to interference caused by signals that are transmitted between BSs or heterogeneous BSs (pica, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention is to provide a method of estimating a non-linear self-interference signal channel at a device using an FDR scheme.

Another object of the present invention is to provide a device for estimating a non-linear self-interference signal channel in an FDR environment.

The technical problems solved by the present invention are not limited to the above technical problems and other technical problems which are not described herein will become apparent to those skilled in the art from the following description.

Technical Solution

The object of the present invention can be achieved by providing a method of estimating a non-linear self-interference signal channel by an apparatus using a full-duplex radio (FDR) scheme including estimating the non-linear self-interference signal channel using a first sequence set included in a predefined first sequence group, wherein the predefined first sequence group is defined in consideration of non-linear self-interference signal components in a radio frequency (RF) transmission (Tx) chain and an RF reception (Rx) chain of the apparatus. A difference in root value between sequences included in the first sequence set may be relatively prime to a sequence length. The method may further include receiving information on root values capable of configuring the predefined first sequence group. Information on the root values may be received through a physical layer signal or a higher layer signal.

The method may further include measuring an intensity of a residual self-interference signal after antenna self-interference cancellation and analog self-interference cancellation to determine whether the self-interference signal component in the RF Rx chain has non-linearity and estimating the non-linear self-interference signal channel using a second sequence set included in a predefined second sequence group upon determining that the self-interference signal in the RF Rx chain is not non-linear, and the predefined second sequence group may be defined in consideration of only the non-linear self-interference signal component of the RF Tx chain among the non-linear self-interference signal components in the RF Tx chain and RF Rx chain of the apparatus.

The method may further include receiving sequence set group information including the first sequence set capable of being used by the device among the sequence sets included in the predefined first sequence group. The sequence set group information may be received through a physical downlink control channel (PDCCH), a physical uplink control channel (PUCCH), or an enhanced physical downlink control channel (EPDCCH).

In another aspect of the present invention, provided herein is an apparatus for estimating a non-linear self-interference signal channel in a full-duplex radio (FDR) environment including a processor configured to estimate the non-linear self-interference signal channel using a first sequence set included in a predefined first sequence group, wherein the predefined first sequence group is defined in consideration of non-linear self-interference signal components in a radio frequency (RF) transmission (Tx) chain and an RF reception (Rx) chain of the apparatus. A difference in root value between sequences included in the first sequence set may be relatively prime to a sequence length.

The device may further include a receiver configured to receive information on root values capable of configuring the predefined first sequence group. The receiver may be configured to receive information on the root values through a physical layer signal or a higher layer signal. The processor may be configured to measure an intensity of a residual self-interference signal after antenna self-interference cancellation and analog self-interference cancellation to determine whether the self-interference signal component in the RF Rx chain is non-linear and to estimate the non-linear self-interference signal channel using a second sequence set included in a predefined second sequence group upon if it is determined the self-interference signal in the RF Rx chain is not non-linearity, and the predefined second sequence group may be defined in consideration of only the non-linear self-interference signal component of the RF Tx chain among the non-linear self-interference signal components in the RF Tx chain and RF Rx chain of the device. The receiver may be configured to receive sequence set group information including the first sequence set capable of being used by the device among the sequence sets included in the predefined first sequence group. The receiver may receive the sequence set group information through a physical downlink control channel (PDCCH), a physical uplink control channel (PUCCH), or an enhanced physical downlink control channel (EPDCCH).

Advantageous Effects

According to one embodiment of the present invention, it is possible to more efficiently cancel digital self-interference, by estimating a non-linear self-interference signal component in an RF transmission chain and an RF reception chain.

The effects of the present invention are not limited to the above-described effects and other effects which are not described herein may be derived by those skilled in the art from the following description of the embodiments of the present invention.

DESCRIPTION OF DRAWINGS

The accompanying drawings, which are included to provide a further understanding of the invention, illustrate embodiments of the invention and together with the description serve to explain the principle of the invention.

FIG. 14 shows a table for an embodiment of a Zadoff-Chu sequence set considering a third order.

BEST MODE

Figure 1:
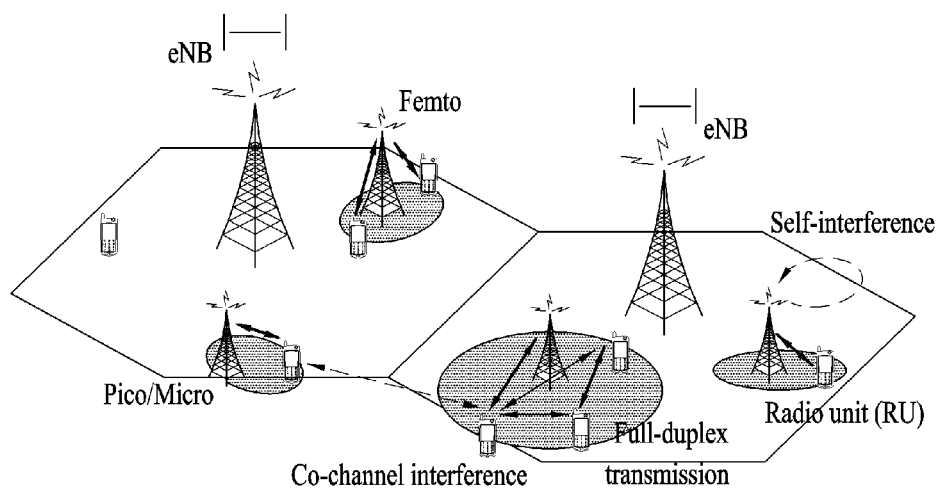
FIG. 1 is a diagram showing an exemplary network supporting a full-duplex/half-duplex communication method of a UE proposed by the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
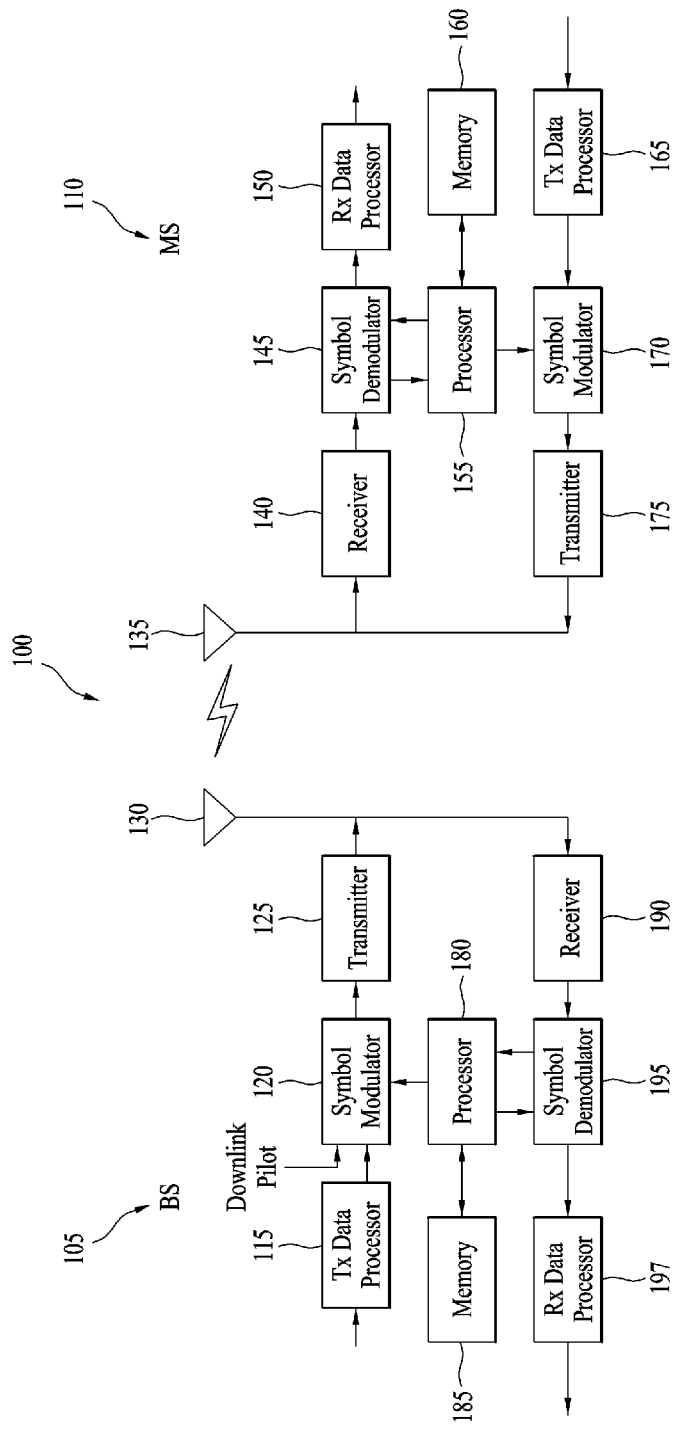
FIG. 2 is a block diagram illustrating configurations of a base station (BS) 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
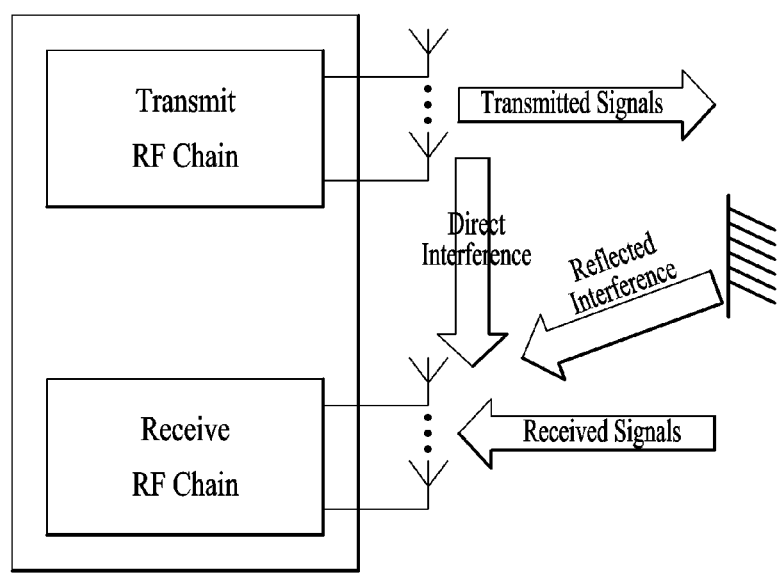
FIG. 3 is a diagram showing the concept of a transmission/reception link and self-interference (SI) in an FDR communication situation.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 1] below.

Types of Self-IC Schemes and Methods for Applying the Self-IC Schemes

Figure 4:
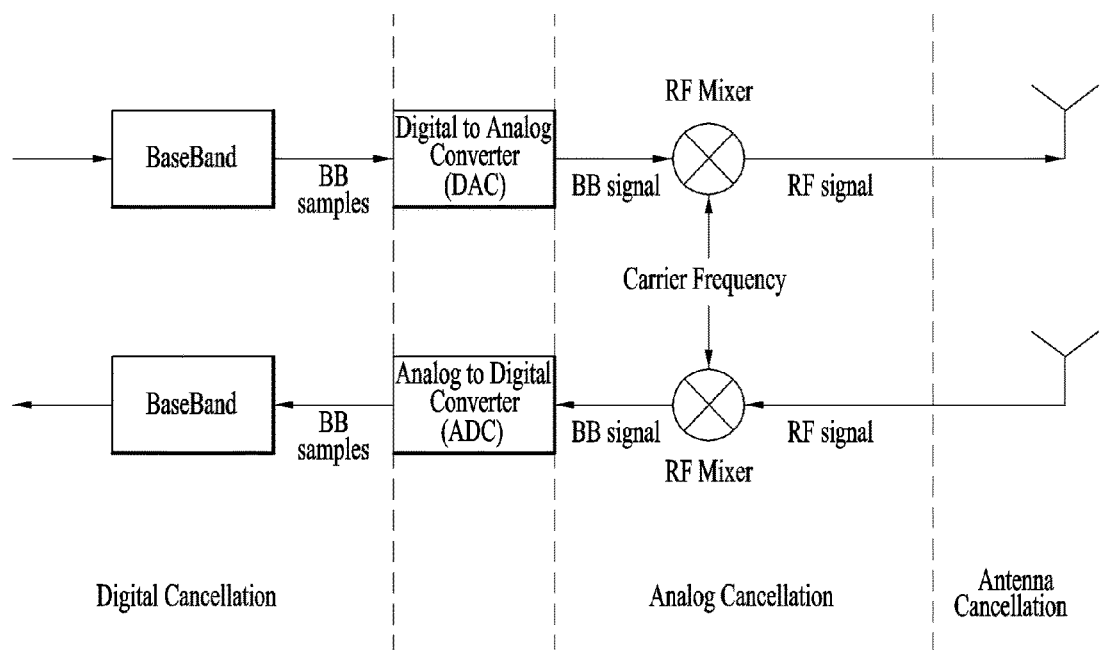
FIG. 4 is a view illustrating positions at which three Self-IC schemes are applied, in a Radio Frequency (RF) Tx and Rx end (or an RF front end) of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance A thermal noise value may be changed to $N_{O,BW}$=174 dBm+10×log$_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

need for the prerequisite that the difference between the signal powers of a designed signal and an interference signal remaining after interference cancellation in one of the above-described techniques should fall into an ADC range, to perform digital Self-IC.

Figure 5:
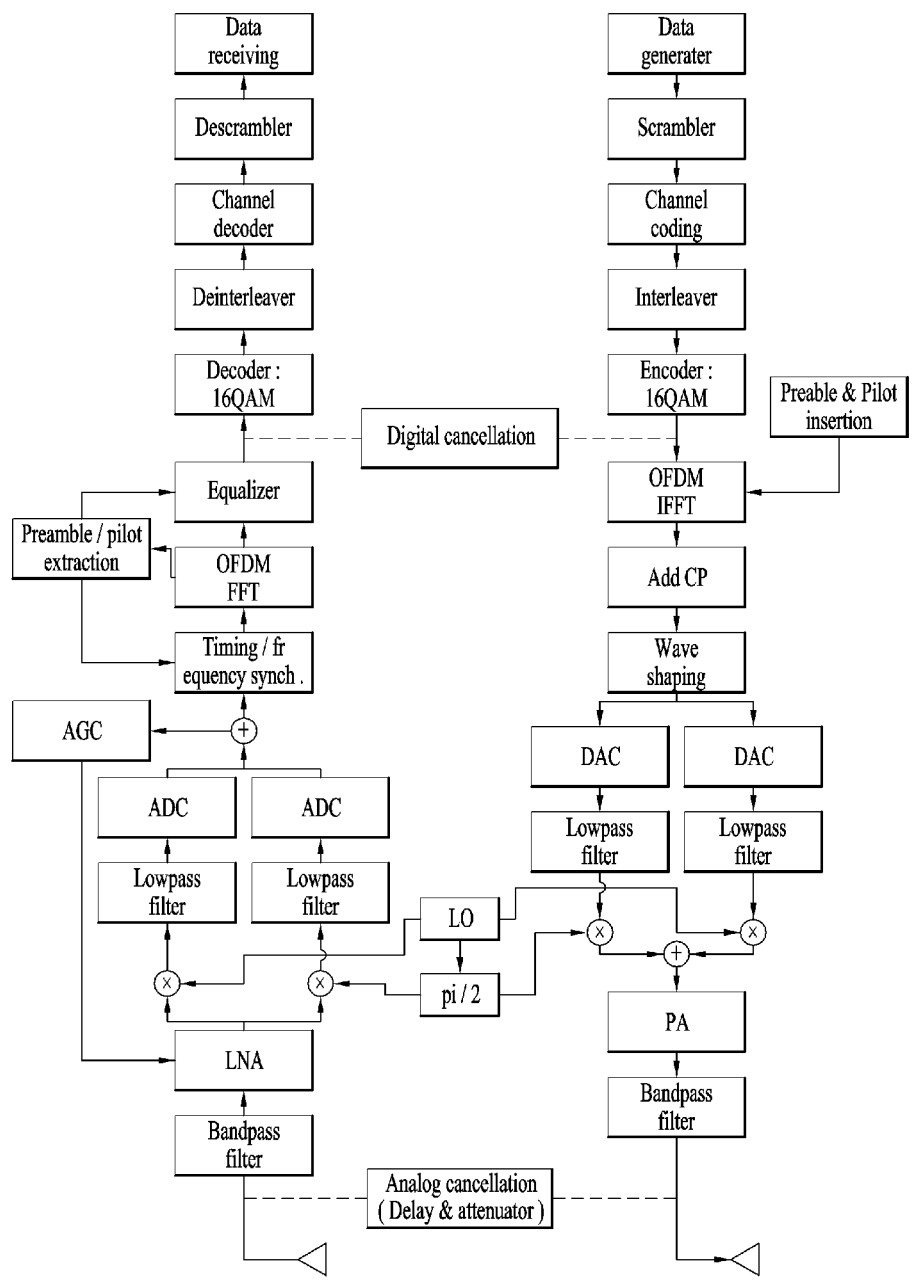
FIG. 5 is a block diagram of a Self-IC device in a proposed communication apparatus in an OFDM communication environment based on FIG. 4

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling of FDR System

A received signal of a device (e.g., a UE, a base station, etc.) in an FDR system may be modeled as shown in Equation 1 below.

$$y[n] = \sum_{\substack{k=1,\ldots,K \\ k=odd}} h_{SI,k}[n] x_{SI}^k[n] + h_D[n] x_D[n] + z[n] \quad \text{[Equation 1]}$$

where, k denotes an odd number, $x_{SI}[n]$ denotes data transmitted by an RF transmission end of the device, $h_{SI}[n]$ denotes gain of self-interference channel experienced by data transmitted by the RF transmission end, $x_D[n]$ denotes data to be received by an RF reception end of the device, $h_D[n]$ denotes gain of a desired channel experienced by data to be received by the RF reception end, and z[n] denotes Additive White Gaussian Noise (AWGN). k=1 indicates a linear component and k having an odd number of 3 or more indicates a non-linear component.

As described above, self-interference channel estimation is necessary for analog or digital self-interference cancellation. At this time, a received signal of the device after performing self-interference cancellation using $\hat{h}_{SI,k}[n]$, for k=1 . . . K (k=odd) which is gain of the estimated analog and/or digital self-interference channel may be expressed as shown in Equation 2 below.

$$y_{Self-IC}[n] = \quad \text{[Equation 2]}$$
$$h_D[n]x_D[n] + \underbrace{\sum_{\substack{k=1,\ldots,K \\ k=odd}} (h_{SI,k}[n] - \hat{h}_{SI,k}[n]) x_{SI}^k[n] + z[n]}_{Residual\ SI}$$

where, in Equation 2 above, k is an odd number. Now, when the received signal is decoded using $\hat{h}_D[n]$ which is gain of the estimated desired channel, Equation 3 below is obtained.

where, $$\frac{\hat{h}_D^*[n] y_{Self-IC}[n]}{|\hat{h}_D[n]|^2} = \frac{\hat{h}_D^*[n] h_D[n]}{|\hat{h}_D[n]|^2} x_D[n] + \frac{\hat{h}_D^*[n] z'[n]}{|\hat{h}_D[t]|^2} \quad \text{[Equation 3]}$$

$$= x_D[n] + \frac{\hat{h}_D^*[n] e[n]}{|\hat{h}_D[n]|^2} + \frac{\hat{h}_D^*[n] z'[n]}{|\hat{h}_D[n]|^2},$$

$$z'[n] = \sum_{\substack{k=1,\ldots,K \\ k=odd}} (h_{SI,k}[n] - \hat{h}_{SI,k}[n]) x_{SI}^k[n] + z[n]$$

and $e[n] = \hat{h}_D[n] - h_D[n]$.

In initial digital self-IC technology, upon modeling an interference signal, only a linear component was modeled to perform digital self-IC. However, recently, for feasible FDR operation, digital self-IC technology using interference signal information of a non-linear component as well as interference signal information of an existing linear component has been proposed. As shown in Equation 1 above, in order to estimate the self-interference information of the non-linear component, it is important to accurately estimate channel coefficient information corresponding to each order.

In existing studies, pseudo inverse of a matrix considering all higher orders of a transmitted signal is calculated and then a non-linear component is estimated. However, such a method requires very complicated inverse calculation and numerous computations and additional resource allocation are necessary to estimate the non-linear higher-order component. Therefore, there is a need for a more efficient system operation process which can reduce complexity of digital self-IC capable of cancelling non-linear self-interference signals including a high order and can improve resource efficiency.

Figure 6:
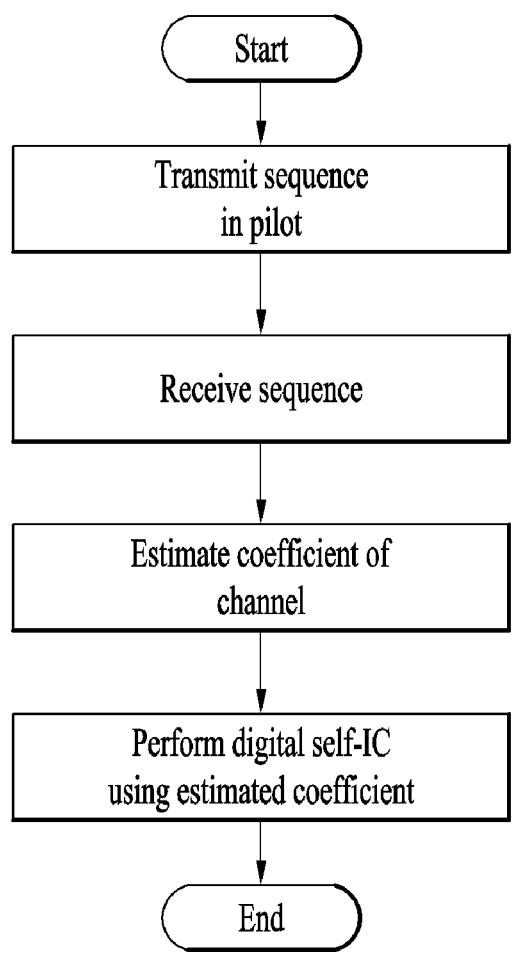
FIG. 6 is a diagram showing an entire procedure of a scheme proposed by the present invention.

FIG. 6 is a diagram showing an entire procedure of a scheme proposed by the present invention.

Referring to FIG. 6, a device (BS/US) using an FDR scheme transmits a sequence in a pilot signal (or reference signal) transmission period, for estimation of a self-interference channel. A transmission end receives the sequence transmitted thereby and estimates a channel coefficient of the self-interference channel using the received sequence. The sequence does not basically require inverse operation and channel estimation may be performed with remarkably less complexity than existing complexity. In addition, in the case of a sequence having a low cross correlation property while having the same sequence property even after operation such as square of 3, 5, etc. among sequences, $\hat{h}_{SI,k}[n]$, for k=1, . . . , K (k=odd) values may be estimated and digital self-IC is performed using the estimated channel information as shown in Equation 2.

Here, for coefficient estimation of the self-interference channel, the cross correlation property of the sequence is used. In the present invention, for example, a Zadoff-Chu sequence which is a sequence having a low cross correlation property while having the same sequence property even after operation such as square of 3, 5, etc. among the above-described sequences will be described. However, the present invention is applicable to another sequence having a low cross correlation property while having the same sequence property even after operation such as square of 3, 5, etc.)

The basic equation and properties of the Zadoff-Chu sequence will now be described.

A complex value of an n-th position (symbol or subcarrier) of a Zadoff-Chu sequence, the length of which is an odd value Nzc and a root value is u, may be expressed as shown in Equation 4 below.

$$s_u[n] = \exp\left\{\frac{-j\pi u n(n+1)}{N_{ZC}}\right\} \quad \text{[Equation 4]}$$

where, 0<n<Nzc, 0<u<Nzc^gcd(Nzc, u)=1, gcd(a,b) denotes a function indicating the greatest common denominator of two integers a and b.

The basic properties of the Zadoff-Chu sequence will now be described.

1) The Zadoff-Chu sequence has a periodic property by Nzc if Nzc is an odd number. The equation thereof is as shown in Equation 5 below.

$$(s_u[n+N_{ZC}] = s_u[n]) \quad \text{[Equation 5]}$$

2) If Nzc is a prime number, DFT of the Zadoff-Chu sequence is scaled to obtain a time-scaled conjugated Zadoff-Chu sequence. ($s_u[k]=s_u[ũk]s_u[0]$, where ũ is the multiplicative inverse of u modulo $N_{ZC}$)

3) Autocorrelation between the Zadoff-Chu sequence and a cyclic-shifted sequence has a value of 0 and the equation thereof is as shown in Equation 6 below.

$$R_{S_u}(k) = \sum_{n=1}^{N_{ZC}-1} s_u[n]s_u^*[(n-k)_{N_{ZC}}] = \begin{cases} N_{ZC}, & k=0 \\ 0, & k \neq 0 \end{cases}$$ [Equation 6]

4) Two Zadoff-Chu sequences having root values of $u_1$ and $u_2$, in which $|u_1-u_2|$ is relatively prime to Nzc, has a cross correlation value of $$\frac{1}{\sqrt{Nzc}}$$

and the equation thereof is as shown in Equation 7 below.

$$C_{S_{u_1,u_2}} = \left| \sum_{n=1}^{N_{ZC}-1} S_{u_1}[n]s_{u_2}^*[n] \right| =$$ [Equation 7]

$$\begin{cases} \frac{1}{\sqrt{N_{ZC}}}, & gcd(N_{ZC},|u_1-u_2|)=1 \\ \text{Not Available}, & gcd(N_{ZC},|u_1-u_2|)>1 \end{cases}$$

<Proposal 1>

Method of Estimating High-Order Channel Coefficient

The high-order channel coefficient of the self-interference channel is estimated using the cross correlation properties of two sequences having different root values. For self-interference channel estimation, since a Zadoff-Chu sequence is used in a pilot symbol (or a reference signal symbol), when Equation 1 above is expressed again using Equation 4 above, Equation 8 below is obtained.

$$y_u[n] = \sum_{\substack{k=1,\ldots,K \\ k=odd}} h_{SI,k}s_u^k[n] + z[n],$$ [Equation 8]

where, in Equation 8, assume that there is no data because no signal is received through a pilot symbol. However, in an FDR system, no problem occurs even when data is received from a counterpart upon channel estimation.)

$s_u^k[n]$ of Equation 8 above is expressed as shown in Equation 9 below.

$$s_u^k[n] = \left[\exp\left\{\frac{-j\pi un(n+1)}{N_{ZC}}\right\}\right]^k$$ [Equation 9]

$$= \exp\left\{\frac{-j\pi kun(n+1)}{N_{ZC}}\right\}$$

$$= s_{ku}[n].$$

Figure 7:
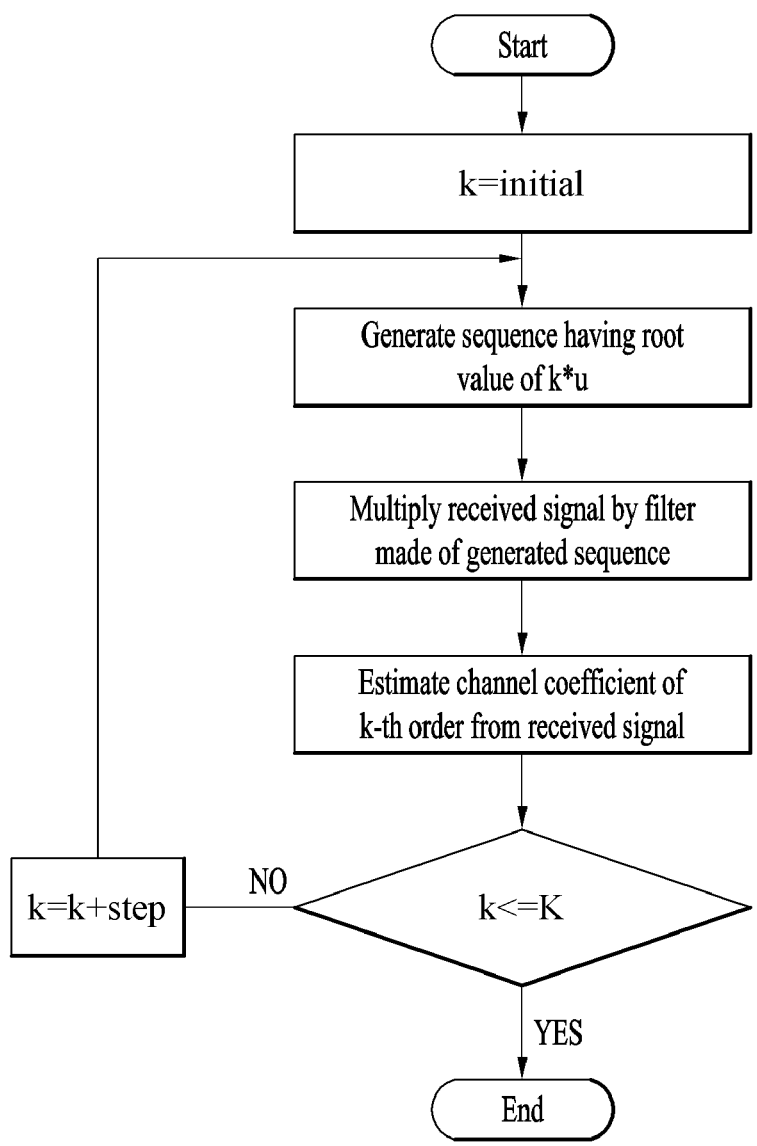
FIG. 7 is a diagram showing a detailed procedure for coefficient estimation of a self-interference channel.

When Equation 8 is expressed again using Equation 9, Equation 10 below is obtained.

$$y_u[n] = \sum_{\substack{k=1,\ldots,K \\ k=odd}} h_{SI,k}s_{ku}[n] + z[n]$$ [Equation 10]

wherein a procedure shown in FIG. 7 is performed in order to estimate $h_{SI,K}$.

FIG. 7 is a diagram showing a detailed procedure for coefficient estimation of a self-interference channel.

Referring to FIG. 7, a sequence starting from k=initial value (e.g., initial value=1) and having a root value of k*u is generated and a received signal is multiplied by a filter made of the generated sequence. For odd-order channel estimation, step is set to 2. Then, a k-order channel coefficient from the received signal may be estimated. If k is less than K (e.g., K=5, 7, 9 or 11), a predetermined value (e.g., step=2) is added such that k becomes 3 and, as the method of generating a sequence having a root value of k*u, the above procedure is repeated until k becomes greater than K.

A channel estimated through an average of signals obtained by multiplying a received signal by a matched filter $s_{ku}^*[n]$ made based on a sequence having a root value of k*u in the above-described procedure is as shown in Equation 11 below.

$$\hat{h}_{SI,k} = \frac{1}{N_{ZC}} \sum_{n=1}^{N_{ZC}} s_{ku}^*[n]y_u[n] =$$ [Equation 11]

$$h_{SI,k} + \frac{1}{N_{ZC}\sqrt{N_{ZC}}} \sum_{\substack{l=1,\ldots,K \\ l=odd \\ l \neq k}} h_{SI,l} + z',$$

wherein Equation 11 may obtain a value of $$s_{ku}^*[n]s_{lu}[n] = \frac{1}{\sqrt{N_{ZC}}}, \text{ for } k \neq l$$

using the cross correlation properties of sequences having different root values, and $$z' = \frac{1}{N_{ZC}} \sum_{n=1}^{N_{ZC}} S_{ku}^*[n]z[n].$$

As in the procedure of FIG. 7, $\hat{h}_{SI,k}$ which is a high-order coefficient of an effective self-interference channel may be estimated using Equation 11, and digital self-interference cancellation may be performed using the same.

As described above, for operation of the FDR system, self-interference channel estimation may be performed using the cross correlation property of the sequence. In some cases, since half-duplex (HD) operation is possible instead of FDR operation (e.g., when self-interference cancellation performance is not obtained due to self-interference channel estimation errors or when system requirements are satisfied even upon HD operation), the proposed sequence is not used and the FDR mode is switched to the HD mode to use an existing channel estimation scheme used in HD.

<Proposal 2>
Method of First Estimating Channel Coefficient of Low Order and then Removing the Same from Received Signal A channel coefficient of a next order is estimated from the above-described signal (the signal obtained by removing the channel coefficients of previous orders from the received signal) and then the channel coefficient of the corresponding order is removed from the above-described signal. The above-described method is repeatedly performed until the channel coefficient of a predetermined order is obtained.

As described in Equation 11, when a channel coefficient of a k-th order of the self-interference channel is estimated, the channel coefficients of the other orders except for the k-th order have interference components scaled down from existing power by $$\frac{1}{\sqrt{N_{ZC}}}$$

due to the cross correlation properties between other sequences included in the same sequence set.

However, in the properties of the self-interference channel, since power corresponding to the high-order channel coefficient is rapidly reduced as order increases, upon estimating the channel coefficient of a high order, although the intensity of interference is scaled down by $$\frac{1}{\sqrt{N_{ZC}}}$$

due to the channel coefficient of a low order, relatively high interference remains, thereby deteriorating performance upon estimation of the channel coefficient of the high order of the self-interference channel.

In order to solve such a problem, in the present invention, a high-order channel coefficient estimation scheme using a successive interference cancellation (SIC) scheme for subtracting a previously estimated low-order sequence component from a received sequence signal upon estimation of a high-order channel coefficient is proposed. A detailed procedure of a proposed scheme will be described with reference to FIG. 8.

Figure 8:
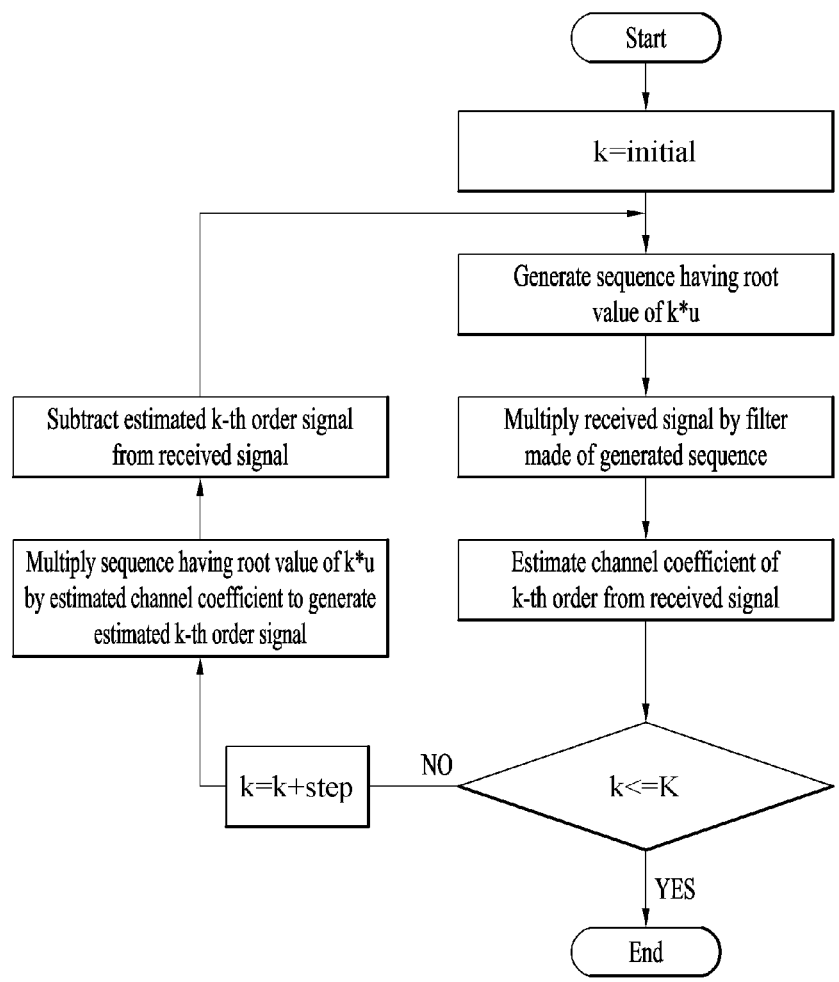
FIG. 8 is a diagram showing a detailed procedure of high-order channel coefficient estimation of a self-interference channel, to which the signal subtraction concept is added.

FIG. 8 is a diagram showing a detailed procedure of high-order channel coefficient estimation of a self-interference channel, to which the signal subtraction concept is added.

Referring to FIG. 8, another procedure is added to the procedure of FIG. 7. A procedure of adding 2 when k is less than K (e.g., K=5, 7, 9) and then multiplying a sequence having a root value of k*u by an estimated channel coefficient to generate a signal of a k-th order is added. For odd-order channel estimation, step is set to 2. A process of subtracting the estimated signal of the k-th order from the received signal is added. Thereafter, the above process is repeated until k becomes greater than K.

First, the channel coefficient corresponding to a first order having k=1 may be subjected to the process of Equation 11 to estimate $\hat{h}_{SI,1}[n]$. Thereafter, a received sequence modified by removing a sequence component multiplied by the estimated channel coefficient from the received sequence for estimation of the channel coefficient corresponding to a third order or more is as shown in Equation 12 below.

$$y_u^{SIC}[n] = y_u[n] - \sum_{k=1,\ldots,k-2} \hat{h}_{SI,k}^{SIC} s_{ku}[n] \quad \text{[Equation 12]}$$

$$= \sum_{\substack{k=k,\ldots,K \\ k=odd}} h_{SI,k} s_{ku}[n] + \sum_{k=1,\ldots,k-2} \left(h_{SI,k} - \hat{h}_{SI,k}^{SIC}\right) s_{ku}[n] + z[n]$$

where, $\hat{h}_{SI,k}^{SIC}$ denotes the estimated channel coefficient ($\hat{h}_{SI,1} = \hat{h}_{SI,1}^{SIC}$), and the value thereof may be obtained by multiplying the received signal obtained through Equation 12 by the matched filter $s^*_{ku}[n]$ made based on the sequence having the root value of k*u and is as shown in Equation 13 below.

$$\hat{h}_{SI,k}^{SIC} = \sum_{n=1}^{N_{ZC}} s^*_{ku}[n] y_u^{SIC}[n] = h_{SI,k} + \frac{1}{N_{ZC}\sqrt{N_{ZC}}} \quad \text{[Equation 13]}$$

$$\left\{ \sum_{l=1,\ldots,k-2} \left(h_{SI,l} - \hat{h}_{SI,l}^{SIC}\right) + \sum_{\substack{l=k+2,\ldots,K \\ l=odd}} h_{SI,k} \right\} + z'.$$

Upon comparing Equation 13 with Equation 11, it can be seen that, in the proposed scheme, interference components generated from the other orders can be reduced as compared to the existing scheme.

<Proposal 3>
Sequence Design Scheme for High-order Channel Coefficient Estimation A root value of an available sequence is determined in consideration of a sequence length Nzc and a final order (K) value of a high-order channel coefficient of a self-interference channel to be estimated.

In order to estimate each channel coefficient using the cross correlation property of the properties of the Zadoff-Chu sequence, in the present invention, the parameter of the sequence needs be designed in consideration of the sequence length and the order of the self-interference channel coefficient to be estimated.

For example, in the Zadoff-Chu sequence, in order to maintain the cross correlation property of the basic properties of the Zadoff-Chu sequence, the value $|u_1 - u_2|$ of the two sequences having root values $u_1$ and $u_2$ should be relatively prime to Nzc. In order to satisfy this, as described in Equation 9, when the order to be estimated increases, the root value of the sequence increases in proportion to the order. Therefore, in order to maintain the cross correlation property with the sequence having a root value k*u generated by an order to be estimated (k greater than 1 is an odd number), u which is the initial root value should be selected. Here, various u values may be selected such that the sequence having the root value of u is not equal to the sequence having the root value of ku in terms of root value.

When two available sequences are arbitrarily extracted from among all available sequences, a condition in which a difference between the root values of the two sequences is relatively prime to Nzc is satisfied by setting a value Nzc to a prime number within a predetermined maximum value. For example, when the maximum value of available resources is 72, prime numbers within 72 of the value Nzc may be 2,3,5,7,11,13,17,19,23,29,31,37,41,43,47,53,59,61, 67 and 71, and one value is selected from among the prime numbers and may be set as the value Nzc. If the above-described condition is satisfied as described above, since the two sequences have the cross correlation value of $$\frac{1}{\sqrt{N_{ZC}}},$$

a value Nzc is preferably selected to be as large as possible in terms of interference remaining upon coefficient estimation of the channel <Proposal 3-1>

In association with design of a sequence for high-order channel coefficient estimation, a cyclic shift property may be used in order to allocate a sequence for high-order channel coefficient estimation to resources. A sequence length Nzc should have a prime number as described above. However, since resource for self-interference channel estimation cannot always have a prime number, an existing sequence should be changed if allocation to resources greater than Nzc is necessary.

In the present invention, a sequence may be generated using the cyclic shift property of the sequence so as to minimize influence of cross correlation. If the length of a container containing the proposed sequence is $N_R$ ($N_R$>Nzc), resources of $N_R$–Nzc remain after containing the proposed sequence. At this time, a sequence obtained by adding $N_R$–Nzc of the existing sequence is as shown in Equation 14 below.

$$s_u[n] = \begin{cases} \exp\left\{\frac{-j\pi un(n+1)}{N_{ZC}}\right\}, & 1 \leq n \leq N_{ZC} \\ \exp\left\{\frac{-j\pi u(n-N_{ZC})(n+1-N_{ZC})}{N_{ZC}}\right\}, & N_{ZC}+1 \leq n \leq N_R \end{cases}$$ [Equation 14]

For example, if 72 which is the maximum number of subcarriers at 1.4 MHz which is minimum BW in LTE is set as a maximum resource value in consideration of backward compatibility of a legacy LTE based system, when Nzc is 71, a sequence value contained in a first resource is copied and inserted into the last 72-nd resource. Here, a larger value Nzc may be set in consideration of resources of an FDR system. If the sequence is configured using such a method, a value larger than $$\frac{1}{\sqrt{N_{ZC}}}$$

which is a cross correlation value composed of a prime number is set, thereby increasing interference upon estimating the coefficient of the self-interference channel In order to estimate a non-linear component of a self-interference channel using cross correlation, a sequence root value needs to be allocated to each user (or UE) and a method of setting an allocable root value satisfies the following conditions.

Condition 1: A sequence set is a set of root values u, gcd(3*u, Nzc), gcd(5*u, Nzc), . . . , gcd(K*u, Nzc)) of up to an order K to be estimated of an odd number from a root value u of a sequence for first order estimation.

Condition 2: In order to reduce interference between sequence sets, the root value of the sequence is configured such that the sequence root sets of all sequence sets are not identical.

Condition 3: The u value may be an integer from 1 to Nzc and an initial u value may be arbitrarily set in order to obtain Condition 2.

The following embodiments may be configured to satisfy all the above-proposed root value setting conditions.

In addition, in the following description, the case where Nzc=71 is selected to have the largest number of the above-described prime numbers will be described.

(1) Zadoff-Chu sequence for digital self-interference cancellation design considering non-linear self-interference signal component of third order Upon performing estimation in consideration of a channel coefficient of a third order among self-interference signals, as shown in Table 2 below, one sequence set of a total of 33 sequence sets may be selected and used. At this time, since a difference in root value between sequences contained in an arbitrary sequence set is relatively prime to the length of a sequence, the cross correlation property of the sequence is satisfied. In addition, in addition to [Table 2] below, other embodiments satisfying relative prime are possible. For example, a root value of a $1^{st}$ order of set 1 may become an integer less than Nzc which is not 1 and various table configurations are possible by the above-described sequence set configuration method.

[Table 2] below shows an example of a Zadoff-Chu sequence set considering up to a third order.

TABLE 2

| Sequence Set | 1st (u) | 3rd (3u) |
|---|---|---|
| Set 1 | 1 | 3 |
| Set 2 | 2 | 6 |
| Set 3 | 4 | 12 |
| Set 4 | 5 | 15 |
| Set 5 | 7 | 21 |
| Set 6 | 8 | 24 |
| Set 7 | 9 | 27 |
| Set 8 | 10 | 30 |
| Set 9 | 11 | 33 |
| Set 10 | 13 | 39 |
| Set 11 | 14 | 42 |
| Set 12 | 16 | 48 |
| Set 13 | 17 | 51 |
| Set 14 | 18 | 54 |
| Set 15 | 19 | 57 |
| Set 16 | 20 | 60 |
| Set 17 | 22 | 66 |
| Set 18 | 23 | 69 |
| Set 19 | 32 | 25 |
| Set 20 | 34 | 31 |
| Set 21 | 37 | 40 |
| Set 22 | 38 | 43 |
| Set 23 | 41 | 52 |
| Set 24 | 43 | 58 |
| Set 25 | 44 | 61 |
| Set 26 | 45 | 64 |
| Set 27 | 46 | 67 |
| Set 28 | 47 | 70 |
| Set 29 | 56 | 26 |
| Set 30 | 59 | 35 |
| Set 31 | 64 | 50 |
| Set 32 | 65 | 53 |
| Set 33 | 68 | 62 |

To this end, the values of the table may be implicitly set, and a rule for transmitting a root value which may configure the above table through a predefined signal (e.g., a physical layer signal or a higher layer signal) may be defined.

(2) Design of Zadoff-Chu sequence for digital self-interference signal cancellation design considering component of non-linear self-interference signal of fifth order Upon performing estimation in consideration of up to a channel coefficient of a fifth order among self-interference signals, as shown in Table 3 below, one sequence set of a total of 17 sequence sets may be selected and used. At this time, since a difference in root value between sequences contained in an arbitrary sequence set is relatively prime to the length of a sequence, the cross correlation property of the sequence is satisfied. In addition, in addition to [Table 3] below, other embodiments satisfying relative prime are possible. For example, since set 1 of [Table 3] includes a root value of 5 in order to estimate a fifth-order component, set 4 having a sequence having a root value of 5 of Table 2 was removed to configure the table. However, if set 1 of [Table 3] is removed, a set having root values of 5, 15 and 35, which is an extension of set 4 of [Table 2], may be configured.

In addition, in addition to [Table 3] below, other embodiments satisfying relative prime are also possible. For example, a first root value of set 1 may become an integer less than Nzc which is not 1, and various tables may be configured by the above-described sequence set configuration method.

TABLE 3

| Sequence Set | 1st (u) | 3rd (3u) | 5th (5u) |
|---|---|---|---|
| Set 1 | 1 | 3 | 5 |
| Set 2 | 2 | 6 | 10 |
| Set 3 | 4 | 12 | 20 |
| Set 4 | 7 | 21 | 35 |
| Set 5 | 8 | 24 | 40 |
| Set 6 | 9 | 27 | 45 |
| Set 7 | 11 | 33 | 55 |
| Set 8 | 13 | 39 | 65 |
| Set 9 | 14 | 42 | 70 |
| Set 10 | 18 | 54 | 19 |
| Set 11 | 22 | 66 | 39 |
| Set 12 | 23 | 69 | 44 |
| Set 13 | 34 | 31 | 28 |
| Set 14 | 41 | 52 | 63 |
| Set 15 | 46 | 67 | 17 |
| Set 16 | 60 | 38 | 16 |
| Set 17 | 68 | 62 | 56 |

To this end, the values of the table may be implicitly set, and a rule for transmitting a root value which may configure the above table through a predefined signal (e.g., a physical layer signal or a higher layer signal) may be defined.

(3) Design of Zadoff-Chu sequence for digital self-interference signal cancellation design considering component of non-linear self-interference signal of seventh order Upon performing estimation in consideration of up to a channel coefficient of a seventh order among self-interference signals, as shown in Table 4 below, one sequence set of a total of 11 sequence sets may be selected and used. At this time, since a difference in root value between sequences contained in an arbitrary sequence set is relatively prime to the length of a sequence, the cross correlation property of the sequence is satisfied. In addition to [Table 4] below, other embodiments satisfying relative prime are possible. For example, a root value of a $1^{st}$ order of set 1 may become an integer less than Nzc which is not 1, and various tables may be configured by the above-described sequence set configuration method. [Table 4] below shows an example of a Zadoff-Chu sequence set considering up to a seventh order.

TABLE 4

| Sequence Set | 1st (u) | 3rd (3u) | 5th (5u) | 7th (7u) |
|---|---|---|---|---|
| Case 1 | 1 | 3 | 5 | 7 |
| Case 2 | 2 | 6 | 10 | 14 |
| Case 3 | 4 | 12 | 20 | 28 |
| Case 4 | 8 | 24 | 40 | 56 |
| Case 5 | 9 | 27 | 45 | 63 |
| Case 6 | 14 | 42 | 70 | 27 |
| Case 7 | 19 | 57 | 24 | 62 |
| Case 8 | 35 | 34 | 33 | 32 |
| Case 9 | 36 | 37 | 38 | 39 |
| Case 10 | 65 | 53 | 41 | 29 |
| Case 11 | 67 | 59 | 51 | 43 |

To this end, the values of the table may be implicitly set, and a rule for transmitting a root value which may configure the above table through a predefined signal (e.g., a physical layer signal or a higher layer signal) may be defined.

(4) Design of Zadoff-Chu sequence for digital self-interference signal cancellation design considering component of non-linear self-interference signal of ninth order Upon performing estimation in consideration of up to a channel coefficient of a ninth order among self-interference signals, as shown in Table 5 below, one sequence set of a total of 7 sequence sets may be selected and used. At this time, since a difference in root value between sequences contained in an arbitrary sequence set is relatively prime to the length of a sequence, the cross correlation property of the sequence is satisfied. In addition to [Table 5] below, other embodiments satisfying relative prime are possible. For example, a root value of a $1^{st}$ order of set 1 may become an integer less than Nzc which is not 1, and various tables may be configured by the above-described sequence set configuration method. [Table 5] below shows an example of a Zadoff-Chu sequence set considering up to a ninth order.

TABLE 5

| Sequence Set | 1st (u) | 3rd (3u) | 5th (5u) | 7th (7u) | 9th (9u) |
|---|---|---|---|---|---|
| Case 1 | 1 | 3 | 5 | 7 | 9 |
| Case 2 | 2 | 6 | 10 | 14 | 18 |
| Case 3 | 4 | 12 | 20 | 28 | 36 |
| Case 4 | 19 | 57 | 24 | 62 | 29 |
| Case 5 | 35 | 34 | 33 | 32 | 31 |
| Case 6 | 37 | 40 | 43 | 46 | 49 |
| Case 7 | 47 | 70 | 22 | 45 | 68 |

To this end, the values of the table may be implicitly set, and a rule for transmitting a root value which may configure the above table through a predefined signal (e.g., a physical layer signal or a higher layer signal) may be defined.

(5) Design of Zadoff-Chu sequence for digital self-interference signal cancellation design considering component of non-linear self-interference signal of eleventh order Upon performing estimation in consideration of up to a channel coefficient of an eleventh order among self-interference signals, as shown in Table 6 below, one sequence set of a total of 6 sequence sets may be selected and used. At this time, since a difference in root value between sequences contained in an arbitrary sequence set is relatively prime to the length of a sequence, the cross correlation property of the sequence is satisfied. In addition to [Table 6] below, other embodiments satisfying relative prime are possible. For example, a root value of a $1^{st}$ order of set 1 may become an integer less than Nzc which is not 1, and various tables may be configured by the above-described sequence set configuration method. [Table 6] below shows an example of a Zadoff-Chu sequence set considering up to an eleventh order.

TABLE 6

| Sequence Set | 1st (u) | 3rd (3u) | 5th (5u) | 7th (7u) | 9th (9u) | 11th (11u) |
|---|---|---|---|---|---|---|
| Case 1 | 1 | 3 | 5 | 7 | 9 | 11 |
| Case 2 | 2 | 6 | 10 | 14 | 18 | 22 |
| Case 3 | 4 | 12 | 20 | 28 | 36 | 44 |
| Case 4 | 19 | 57 | 24 | 62 | 29 | 67 |
| Case 5 | 35 | 34 | 33 | 32 | 31 | 30 |
| Case 6 | 37 | 40 | 43 | 46 | 49 | 52 |

To this end, the values of the table may be implicitly set, and a rule for transmitting a root value which may configure the above table through a predefined signal (e.g., a physical layer signal or a higher layer signal) may be defined.

<Proposal 4>

Method for Wideband Self-interference Channel Estimation

Existing self-interference channel estimation is suitable for estimation of a representative value of a channel over the total bandwidth. However, in the case of a wideband self-interference channel, a channel coefficient may be changed according to subband. For such wideband self-interference channel, a sequence length may be adjusted and designed.

In order to estimate a per-subband channel coefficient of a wideband self-interference channel, a sequence length may be reduced to use a sequence set suitable for each subband.

As described above, if the cross correlation condition of the sequence is satisfied, since two sequences have a cross correlation value of $$\frac{1}{\sqrt{Nzc}},$$

Nzc may be selected to be as large as possible in terms of interference remaining upon estimating the channel coefficient. Therefore, for a wideband self-interference channel, a largest sequence length may be selected upon using a sequence set per subband.

Figure 9:
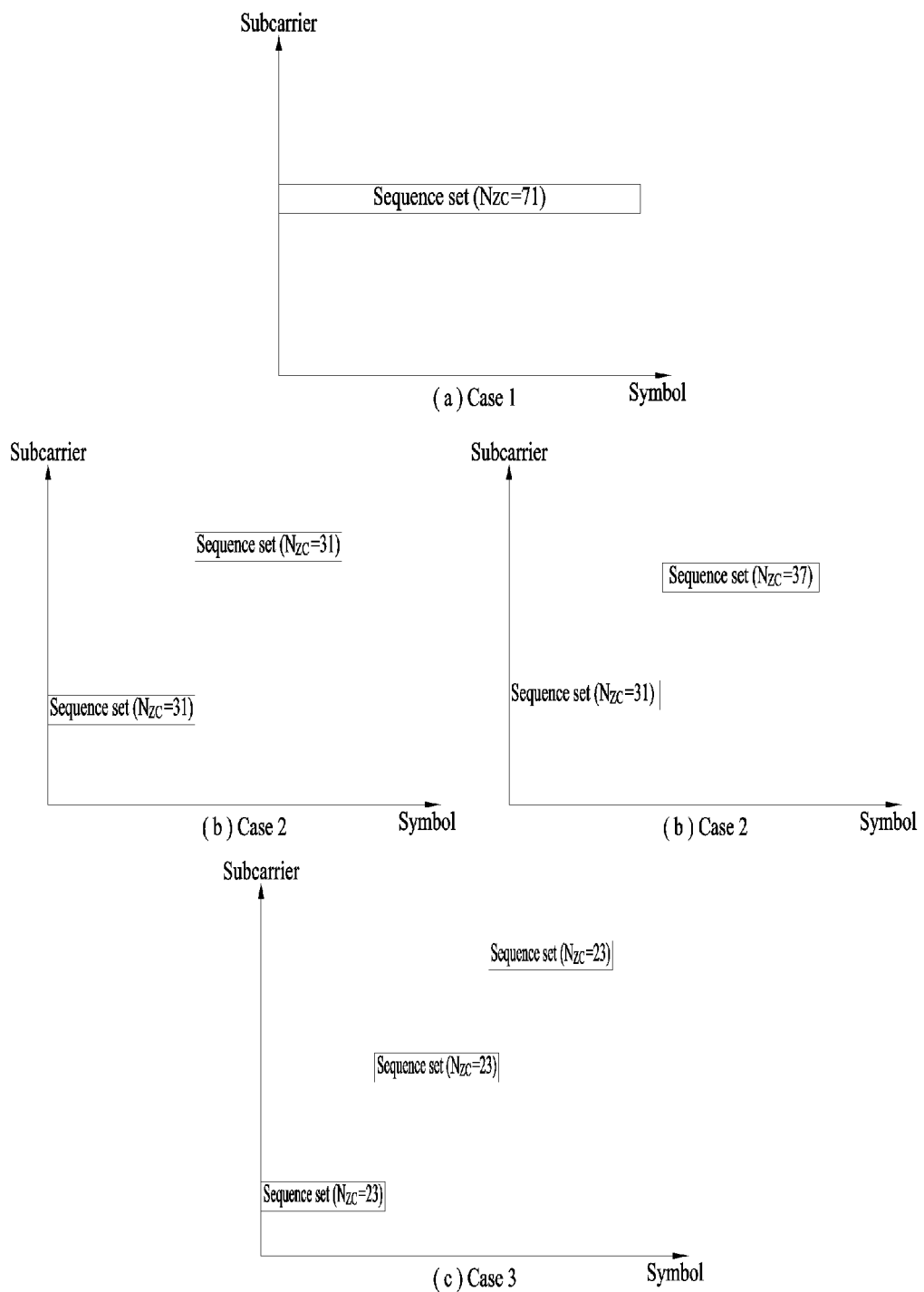
FIG. 9 is a diagram showing various examples of applying a sequence set for wideband self-interference channel estimation.

FIG. 9 is a diagram showing various examples of applying a sequence set for wideband self-interference channel estimation.

FIG. 9 shows an embodiment of using sequence sets having various lengths for self-interference channel coefficient estimation of 1, 2 or 3 subbands. In (a) of FIG. 9, Case 1 shows an existing method of obtaining the representative value of one channel coefficient. In (b) of FIG. 9, Case 2 shows a method of obtaining the representative value of each channel coefficient in two subbands. In (c) of FIG. 9, the left figure shows the case where sequence sets having the same length are used and the right figure shows the case where a sequence set having a largest sequence length within a given length range is applied. Case 3 shown in (c) of FIG. 9 shows a method of obtaining the representative value of each channel coefficient in three subbands. Here, sequence sets having the same root value or sequence sets having different root values may be used as the sequence sets having the same length, because channel coefficient estimation performance is not substantially changed.

<Proposal 5>

Method for Supporting Self-interference Channel Estimation of Multiple Users (UEs) Based on FDR In order to minimize interference upon high-order channel coefficient estimation of a self-interference channel between multiple users supporting FDR, the above-described sequence sets may be grouped and used. The above-proposed sequence sets may consider cross correlation for estimating a high-order channel coefficient. However, interference may be generated in a self-interference estimation period between multiple users using the same band upon estimation of the self-interference channel between multiple users. In order to minimize inter-user interference, a sequence set changed according to user (UE) may be used. At this time, cross correlation between sequence sets needs to be considered.

In the present embodiment, a method of grouping sequence sets which may be used between adjacent users operating in FDR is proposed. Sequence sets, which may maintain cross correlation, among several sequence sets may be grouped and allocated to multiple adjacent users, thereby minimizing inter-user interference upon self-interference channel estimation. To this end, an available sequence set group number of each user may be signaled through a physical layer signal or a higher layer signal. For example, a base station may notify a UE of a sequence set group number available per UE using a physical layer signal such as a physical downlink control channel (PDCCH), an enhanced PDCCH (EPDCCH), etc. or a higher layer signal such as a radio resource control (RRC) signal. Meanwhile, the UE may notify the base station of the sequence set group number available per UE through a physical uplink control channel (PUCCH), etc.

The following embodiments show design of a sequence set grouping method when Nzc=71 based on the above-proposed embodiments.

(1) Sequence set grouping method for supporting multiple users among Zadoff-Chu sequence sets for digital self-interference cancellation design considering non-linear self-interference signal component of third order Upon performing estimation in consideration of a channel coefficient of a third order among self-interference signals, grouping may be performed such that all sequences of the 33 sequence sets described in [Table 2] mutually maintain cross correlation. At this time, since a difference in root value between sequences contained in an arbitrary sequence set is relatively prime to the length of a sequence, the cross correlation property of the sequence is satisfied. In addition to [Table 7] below, other embodiments satisfying relative prime are possible. For example, a root value of a $1^{st}$ order of set 1 may become an integer less than Nzc which is not 1 and various table configurations are possible by the above-described sequence set configuration method. [Table 7] below shows an example of a Zadoff-Chu sequence set considering up to a third order.

TABLE 7

| Sequence Set | Sequence Set Group | 1st (u) | 3rd (3u) |
|---|---|---|---|
| Set 1 | A | 1 | 3 |
| Set 2 | B | 2 | 6 |
| Set 3 | B | 4 | 12 |
| Set 4 | A | 5 | 15 |
| Set 5 | A | 7 | 21 |
| Set 6 | B | 8 | 24 |
| Set 7 | A | 9 | 27 |
| Set 8 | B | 10 | 30 |
| Set 9 | A | 11 | 33 |
| Set 10 | A | 13 | 39 |
| Set 11 | B | 14 | 42 |

TABLE 7-continued

| Sequence Set | Sequence Set Group | 1st (u) | 3rd (3u) |
|---|---|---|---|
| Set 12 | B | 16 | 48 |
| Set 13 | A | 17 | 51 |
| Set 14 | B | 18 | 54 |
| Set 15 | A | 19 | 57 |
| Set 16 | B | 20 | 60 |
| Set 17 | B | 22 | 66 |
| Set 18 | A | 23 | 69 |
| Set 19 | C | 32 | 25 |
| Set 20 | D | 34 | 31 |
| Set 21 | B | 37 | 40 |
| Set 22 | A | 38 | 43 |
| Set 23 | D | 41 | 52 |
| Set 24 | C | 43 | 58 |
| Set 25 | D | 44 | 61 |
| Set 26 | B | 45 | 64 |
| Set 27 | C | 46 | 67 |
| Set 28 | D | 47 | 70 |
| Set 29 | B | 56 | 26 |
| Set 30 | C | 59 | 35 |
| Set 31 | D | 64 | 50 |
| Set 32 | C | 65 | 53 |
| Set 33 | A | 68 | 62 |

To this end, the values of the table may be implicitly set, and a rule for transmitting a root value which may configure the above table through a predefined signal (e.g., a physical layer signal or a higher layer signal) may be defined.

(2) Sequence set grouping method for supporting multiple users among Zadoff-Chu sequence sets for digital self-interference cancellation design considering non-linear self-interference signal component of fifth order Upon performing estimation in consideration of a channel coefficient of a fifth order among self-interference signals, grouping may be performed such that all sequences of the 17 sequence sets described in [Table 8] mutually maintain cross correlation. At this time, since a difference in root value between sequences contained in an arbitrary sequence set is relatively prime to the length of a sequence, the cross correlation property of the sequence is satisfied. In addition to [Table 8] below, other embodiments satisfying relative prime are possible. For example, a root value of a $1^{st}$ order of set 1 may become an integer less than Nzc which is not 1 and various table configurations are possible by the above-described sequence set configuration method. [Table 8] below shows an example of a Zadoff-Chu sequence set considering up to a fifth order.

TABLE 8

| Sequence Set | Sequence Set Group | 1st (u) | 3rd (3u) | 5th (5u) |
|---|---|---|---|---|
| Set 1 | A | 1 | 3 | 5 |
| Set 2 | B | 2 | 6 | 10 |
| Set 3 | B | 4 | 12 | 20 |
| Set 4 | A | 7 | 21 | 35 |
| Set 5 | B | 8 | 24 | 40 |
| Set 6 | A | 9 | 27 | 45 |
| Set 7 | A | 11 | 33 | 55 |
| Set 8 | A | 13 | 39 | 65 |
| Set 9 | B | 14 | 42 | 70 |
| Set 10 | B | 18 | 54 | 19 |
| Set 11 | C | 22 | 66 | 39 |
| Set 12 | A | 23 | 69 | 44 |
| Set 13 | B | 34 | 31 | 28 |
| Set 14 | C | 41 | 52 | 63 |
| Set 15 | A | 46 | 67 | 17 |
| Set 16 | B | 60 | 38 | 16 |
| Set 17 | B | 68 | 62 | 56 |

To this end, the values of the table may be implicitly set, and a rule for transmitting a root value which may configure the above table through a predefined signal (e.g., a physical layer signal or a higher layer signal) may be defined.

(3) Sequence set grouping method for supporting multiple users among Zadoff-Chu sequence sets for digital self-interference cancellation design considering non-linear self-interference signal component of seventh order Upon performing estimation in consideration of a channel coefficient of a seventh order among self-interference signals, grouping may be performed such that all sequences of the 11 sequence sets described in [Table 9] mutually maintain cross correlation. At this time, since a difference in root value between sequences contained in an arbitrary sequence set is relatively prime to the length of a sequence, the cross correlation property of the sequence is satisfied. In addition, in addition to [Table 9] below, other embodiments satisfying relative prime are possible. For example, a root value of a $1^{st}$ order of set 1 may become an integer less than Nzc which is not 1 and various table configurations are possible by the above-described sequence set configuration method. [Table 9] below shows an example of a Zadoff-Chu sequence set considering up to a seventh order.

TABLE 9

| Sequence Set | Sequence Set Group | 1st (u) | 3rd (3u) | 5th (5u) | 7th (7u) |
|---|---|---|---|---|---|
| Set 1 | A | 1 | 3 | 5 | 7 |
| Set 2 | B | 2 | 6 | 10 | 14 |
| Set 3 | B | 4 | 12 | 20 | 28 |
| Set 4 | B | 8 | 24 | 40 | 56 |
| Set 5 | A | 9 | 27 | 45 | 63 |
| Set 6 | B | 14 | 42 | 70 | 27 |
| Set 7 | A | 19 | 57 | 24 | 62 |
| Set 8 | A | 35 | 34 | 33 | 32 |
| Set 9 | B | 36 | 37 | 38 | 39 |
| Set 10 | A | 65 | 53 | 41 | 29 |
| Set 11 | B | 67 | 59 | 51 | 43 |

To this end, the values of the table may be implicitly set, and a rule for transmitting a root value which may configure the above table through a predefined signal (e.g., a physical layer signal or a higher layer signal) may be defined.

(4) Sequence set grouping method for supporting multiple users among Zadoff-Chu sequence sets for digital self-interference cancellation design considering non-linear self-interference signal component of ninth order Upon performing estimation in consideration of a channel coefficient of a ninth order among self-interference signals, grouping may be performed such that all sequences of the 7 sequence sets described in [Table 10] mutually maintain cross correlation. At this time, since a difference in root value between sequences contained in an arbitrary sequence set is relatively prime to the length of a sequence, the cross correlation property of the sequence is satisfied. In addition to [Table 10] below, other embodiments satisfying relative prime are possible. For example, a root value of a $1^{st}$ order of set 1 may become an integer less than Nzc which is not 1 and various table configurations are possible by the above-described sequence set configuration method. [Table 10] below shows an example of a Zadoff-Chu sequence set considering up to a ninth order.

TABLE 10

| Sequence Set | Sequence Set Group | 1st (u) | 3rd (3u) | 5th (5u) | 7th (7u) | 9th (9u) |
|---|---|---|---|---|---|---|
| Set 1 | A | 1 | 3 | 5 | 7 | 9 |
| Set 2 | B | 2 | 6 | 10 | 14 | 18 |
| Set 3 | B | 4 | 12 | 20 | 28 | 36 |
| Set 4 | A | 19 | 57 | 24 | 62 | 29 |
| Set 5 | A | 35 | 34 | 33 | 32 | 31 |
| Set 6 | B | 37 | 40 | 43 | 46 | 49 |
| Set 7 | A | 47 | 70 | 22 | 45 | 68 |

To this end, the values of the table may be implicitly set, and a rule for transmitting a root value which may configure the above table through a predefined signal (e.g., a physical layer signal or a higher layer signal) may be defined.

(5) Sequence set grouping method for supporting multiple users among Zadoff-Chu sequence sets for digital self-interference cancellation design considering non-linear self-interference signal component of eleventh order Upon performing estimation in consideration of a channel coefficient of an eleventh order among self-interference signals, grouping may be performed such that all sequences of the 6 sequence sets described in [Table 11] mutually maintain cross correlation. At this time, since a difference in a root value between sequences contained in an arbitrary sequence set is relatively prime to the length of a sequence, the cross correlation property of the sequence is satisfied. In addition to [Table 11] below, other embodiments satisfying relative prime are possible. For example, a root value of a $1^{st}$ order of set 1 may become an integer less than Nzc which is not 1 and various table configurations are possible by the above-described sequence set configuration method. [Table 11] below shows an example of a Zadoff-Chu sequence set considering up to an eleventh order.

TABLE 11

| Sequence Set | Sequence Set Group | 1st (u) | 3rd (3u) | 5th (5u) | 7th (7u) | 9th (9u) | 11th (11u) |
|---|---|---|---|---|---|---|---|
| Set 1 | A | 1 | 3 | 5 | 7 | 9 | 11 |
| Set 2 | B | 2 | 6 | 10 | 14 | 18 | 22 |
| Set 3 | B | 4 | 12 | 20 | 28 | 36 | 44 |
| Set 4 | A | 19 | 57 | 24 | 62 | 29 | 67 |
| Set 5 | A | 35 | 34 | 33 | 32 | 31 | 30 |
| Set 6 | B | 37 | 40 | 43 | 46 | 49 | 52 |

To this end, the values of the table may be implicitly set, and a rule for transmitting a root value which may configure the above table through a predefined signal (e.g., a physical layer signal or a higher layer signal) may be defined.

<Proposal 6>

Proposal 6 describes methods for supporting self-interference channel estimation in consideration of non-linearity of a Tx chain and an Rx chain. Proposal 1 to Proposal 5 are based on sequences designed in consideration of only non-linearity in an I/Q mixer and a power amplifier of the Tx chain. However, in addition to the Tx chain, even in the Rx chain, non-linearity appears due to a baseband (BB) amplifier such as a low noise amplifier (LNA), an I/Q mixer or a variable gain amplifier (VGA). For accurate estimation of a self-interference channel coefficient, a channel coefficient value may be estimated in consideration of non-linearity of the Tx-chain and the Rx-chain.

Figure 10:
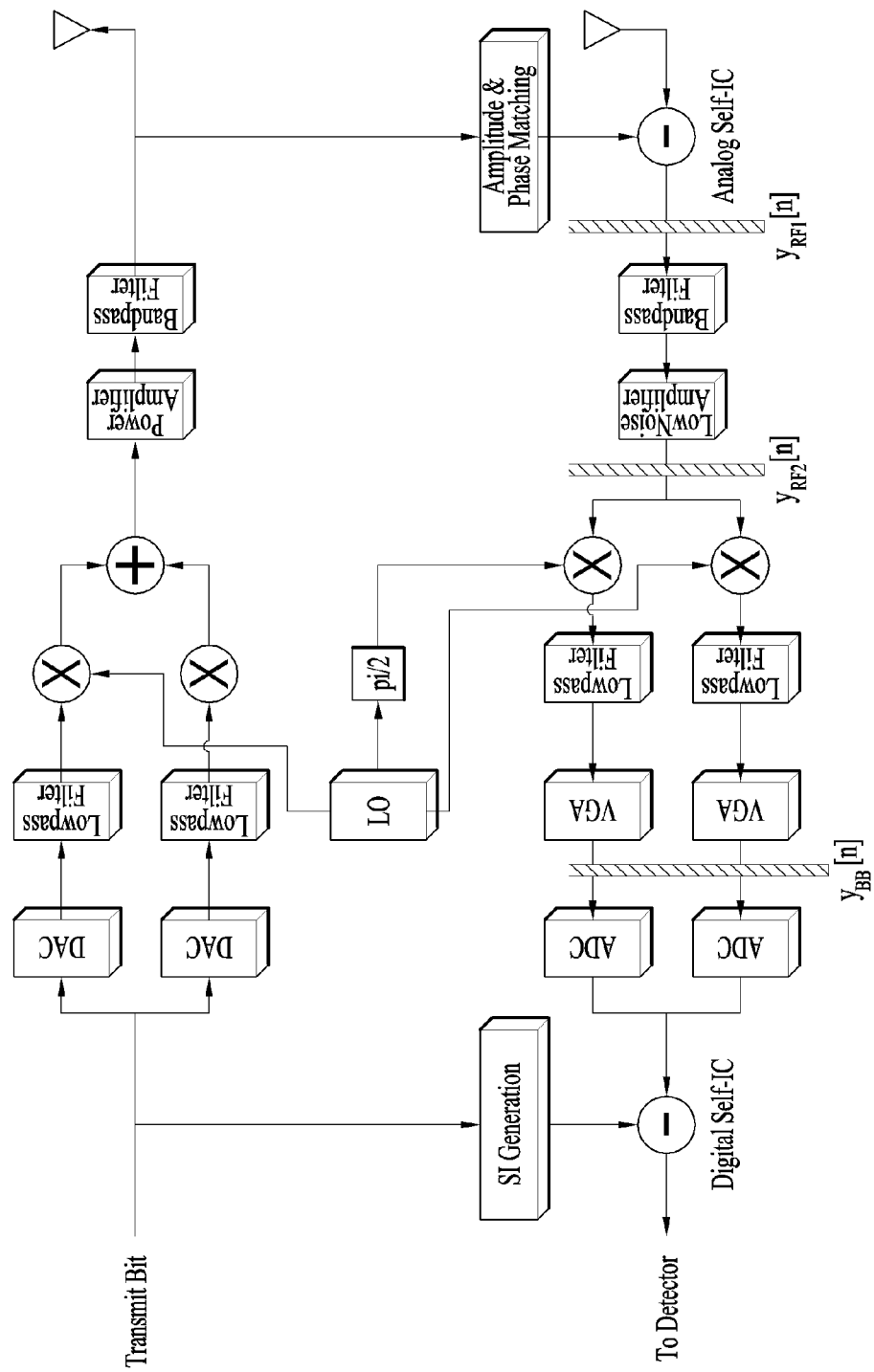
FIG. 10 is a diagram showing blocks of an FDR transceiver for cancelling self-interference and received (Rx) signals in an FDR environment.

FIG. 10 is a diagram showing blocks of an FDR transceiver for cancelling self-interference and received (Rx) signals in an FDR environment.

In FIG. 10, a portion corresponding to the Rx chain of FIG. 5 is shown in detail. When $y_{RF1}[n]$ which is a received signal subjected to analog self-interference cancellation based on the received signal shown in FIG. 10 is expressed again based on Equation 10, Equation 15 below is obtained.

$$y_{RF1}[n] = \sum_{\substack{k=1,\ldots,K \\ k=odd}} h_{SI,k}[n]s_{ku}[n] + z[n], \quad \text{[Equation 15]}$$

When $y_{RF2}[n]$ which is a signal after passing the LNA is modeled up to a third order in baseband, Equation 16 below is obtained.

$$y_{RF2}[n]=k_{LNA}y_{RF1}[n]+\alpha|y_{RF1}[n]|^2 y_{RF1}[n] \quad \text{[Equation 16]}$$

where, $K_{LNA}$ denotes a coefficient value corresponding to a linear component in the LNA, and $\alpha$ denotes a coefficient value corresponding to a non-linear component in the LNA. In addition, $y_{BB}[n]$ which is a signal having passed through both the I/Q mixer and the VGA is modeled up to a third order in baseband, Equation 17 below is obtained.

$$y_{BB}[n]=k_{BB}y_{RF2}[n]+\beta|y_{RF2}[n]|^2+\gamma[y^*_{RF2}[n]]^3, \quad \text{[Equation 17]}$$

where, $K_{BB}$ denotes a coefficient value corresponding to a linear component having passed through the I/Q Mixer and the VGA, and $\beta$ and $\gamma$ denote coefficient values corresponding to non-linear components having passed through the I/Q Mixer and the VGA.

When $y_{BB}[n]$ of Equation 17 above is expressed by an equation of $y_{RF1}[n]$, Equation 18 below is obtained.

$$y_{BB}[n]=a_1 y_{RF1}[n]a_2|y_{RF1}[n]|^2+a_3|y_{RF1}[n]|^2 y_{RF1}[n]+a_4 [y^*_{RF1}[n]]^3+z'[n], \quad \text{[Equation 18]}$$

where, $a_i$ (for i=1,2,3,4) is a combined coefficient value composed of $K_{LNA}$, $K_{BB}$, $\alpha$, $\beta$, and $\gamma$ corresponding to respective orders, and $z'[n]$ denotes a noise value changed by non-linearity of the Rx Chain (Equation 18 above expresses up to the third order for convenience of description and may extend to an N-th order, for example).

The combined coefficient value of $y_{BB}[n]$ is a hardware characteristic value and thus is constant if a surrounding environment is fixed (if the intensity of a received signal is constant). Therefore, signals sampled during a specific time in advance may be stacked to calculate each combined coefficient value. Using the calculated value, digital self-interference cancellation may be performed in consideration of distortion generated by non-linearity of the Rx chain.

However, $y_{BB}[n]$ generates a component of a higher order than an order contained in $y_{RF1}[n]$. In this case, since components interrupting cross correlation of sequences may be included, a sequence set needs to be determined in consideration of sequences having different root values generated by the order contained in $y_{BB}[n]$. Therefore, a sequence set may be configured such that a sequence set having a root value of k*u generated by the Tx chain and sequences additionally generated by the Rx chain are not equal in terms of the root value.

For example, when $y_{RF1}[n]$ is expressed again in consideration of the non-linear self-interference channel component of the third order in the Tx chain, $y_{RF1}[n]=h_{SI,1}[n]s_u[n]+h_{SI,3}[n]s_{3u}[n]+z[n]$ is obtained and is substituted into Equation 18, thereby obtaining Equation 19 below.

$$y_{BB}[n] = a_1(h_{SI,1}[n]s_u[n] + h_{SI,3}[n]s_{3u}[n]) + \quad \text{[Equation 19]}$$

-continued $$a_2|h_{SI,1}[n]s_u[n] + h_{SI,3}[n]s_{3u}[n]|^2 +$$

$$a_3|h_{SI,1}[n]s_u[n] + h_{SI,3}[n]s_{3u}[n]|^2$$

$$(h_{SI,1}[n]s_u[n] + h_{SI,3}[n]s_{3u}[n]) +$$

$$a_4[h^*_{SI,1}[n]s^*_u[n] + h^*_{SI,3}[n]s^*_{3u}[n]]^3 + z'[n]$$

If Equation 19 above is rearranged according to order, Equation 20 below is obtained.

$$y_{BB}[n] = \quad \text{[Equation 20]}$$

$$a_1 h_{SI,1}[n]s_u[n] + (a_2 h^2_{SI,1}[n] + a_3 h^2_{SI,1}[n]h_{SI,3}[n])|s_u[n]|^2 +$$

$$a_1 h_{SI,3}[n]s_{3u}[n] + a_3 h^3_{SI,1}[n]|s_u[n]|^2 s_u[n] +$$

$$a_4(h^*_{SI,1}[n])^3|s_u[n]|^2 s^*_u[n] +$$

$$2a_2 h_{SI,1}[n]h_{SI,3}[n]|s_u[n]||s_{3u}[n]| +$$

$$2a_3 h^2_{SI,1}[n]h_{SI,3}[n]|s_u[n]|s_u[n]|s_{3u}[n]| +$$

$$3a_4(h^*_{SI,1}[n])^2 h^*_{SI,3}[n]|s_u[n]|^2 s^*_{3u}[n] +$$

$$(a_2 h^2_{SI,3}[n] + a_3 h^3_{SI,3}[n])|s_{3u}[n]|^2 +$$

$$a_3 h_{SI,1}[n]h^2_{SI,3}[n]|s_{3u}[n]|^2 s_u[n] +$$

$$2a_3 h_{SI,1}[n]h^2_{SI,3}[n]|s_u[n]||s_{3u}[n]|s_{3u}[n] +$$

$$3a_4 h^*_{SI,1}[n](h^*_{SI,3}[n])^2 s^*_u[n]|s_{3u}[n]|^2 +$$

$$a_4(h^*_{SI,3}[n])^3|s_{3u}[n]|^2 s^*_{3u}[n] + z'[n]$$

The coefficient form and sequence form corresponding to each order of Equation 20 above is as shown in [Table 12] below.

TABLE 12

| order | Coefficient form | Sequence form |
|---|---|---|
| 1 | $a_1 h_{SI,1}[n]$ | $s_u[n]$ |
| 2 | $a_2 h_{SI,1}^2[n] + a_3 h_{SI,1}^2[n]h_{SI,3}[n]$ | $|s_u[n]|^2$ |
| 3 | $a_1 h_{SI,3}[n]$ | $s_{3u}[n]$ |
|   | $a_3 h_{SI,1}^3[n]$ | $|s_u[n]|^2 s_u[n]$ |
|   | $a_4(h_{SI,1}^*[n])^3$ | $|s_u[n]|^2 s_u^*[n]$ |
| 4 | $2a_2 h_{SI,1}[n]h_{SI,3}[n]$ | $|s_u[n]||s_{3u}[n]|$ |
| 5 | $2a_3 h_{SI,1}^2[n]h_{SI,3}[n]$ | $|s_u[n]|s_u[n]|s_{3u}[n]|$ |
|   | $3a_4(h_{SI,1}^*[n])^2 h_{SI,3}^*[n]$ | $|s_u[n]|^2 s_{3u}^*[n]$ |
| 6 | $a_2 h_{SI,3}^2[n] + a_3 h_{SI,3}^3[n]$ | $|s_{3u}[n]|^2$ |
| 7 | $a_3 h_{SI,1}[n]h_{SI,3}^2[n]$ | $|s_{3u}[n]|^2 s_u[n]$ |
|   | $2a_3 h_{SI,1}[n]h_{SI,3}^2[n]$ | $|s_u[n]||s_{3u}[n]|s_{3u}[n]|$ |
|   | $3a_4 h_{SI,1}^*[n](h_{SI,3}^*[n])^2$ | $|s_u^*[n]|s_{3u}[n]|^2$ |
| 9 | $a_4(h_{SI,3}^*[n])^3$ | $|s_{3u}[n]|^2 s_{3u}^*[n]$ |

As shown in [Table 12] above, when a non-linear component of up to a third order is considered in the Tx chain and the Rx chain, sequences having various components corresponding to first, second, third, fourth, fifth, sixth, seventh and ninth orders are generated. Values obtained in the above-described example are $a_1 h_{SI,1}[n]$ and $a_1 h_{SI,3}[n]$ which are channel coefficients corresponding to each order of the self-interference channel distorted by the Tx chain. As in Proposal 1 or 2, a channel coefficient value is estimated using sequence sets having root values corresponding to first and third orders and then values estimated in first and third orders may be updated using a sequence having a root value corresponding to a second order.

A signal obtained by multiplying a received signal by a matched filter $s^*_{2u}[n]$ made based on a sequence $S_{2u}[n]$ having a root value of 2u corresponding to a second order is expressed by Equation 21 below.

$$s^*_{2u}[n]y_{SS}[n] = a_2 h_{SI,1}^2[n] + a_3 h_{SI,1}^2[n]h_{SI,3}[n] + z''[n],$$
$$= f_2(h_{SI,1}, h_{SI,3}), \quad \text{[Equation 21]}$$

In Equation 21 above, $z''[n] = s^*_{2u}[n](y_{BB}[n] - (a_2 h_{SI,1}^2[n] + a_3 h_{SI,1}^2[n]h_{SI,3}[n])|s_u[n]|^2)$ is noise generated by all components excluding a value corresponding to a second-order component.

As shown in Equation 21, the coefficient corresponding to the second order contains channel components of first and third orders. Therefore, this equation may be updated to Equation 22 below such that previously obtained channel components of the first and third orders are more accurately estimated.

$$\hat{h}_{SI,1} = \kappa_1 \hat{h}_{SI,1} + (1-\kappa_1)\hat{f}_2(h_{SI,1}, h_{SI,3}),$$

$$\hat{h}_{SI,3} = \kappa_3 \hat{h}_{SI,3} + (1-\kappa_3)\hat{f}_2(h_{SI,1}, h_{SI,3}), \quad \text{[Equation 22]}$$

where, $k_1$ or $k_3$ is a coefficient value for update in a range from 0 to 1 and may be properly selected according to environments. If $k_1$ or $k_3$ has a value of 1, the same value as the value obtained through Proposal 1 or Proposal 2 is obtained.

Although the channel coefficient value is updated using only the component of the second order in the above-described example, the channel coefficient value may be updated using the other order other than the second order described in [Table 12]. The process of the above-proposed channel estimation method is as shown in FIG. 11.

Figure 11:
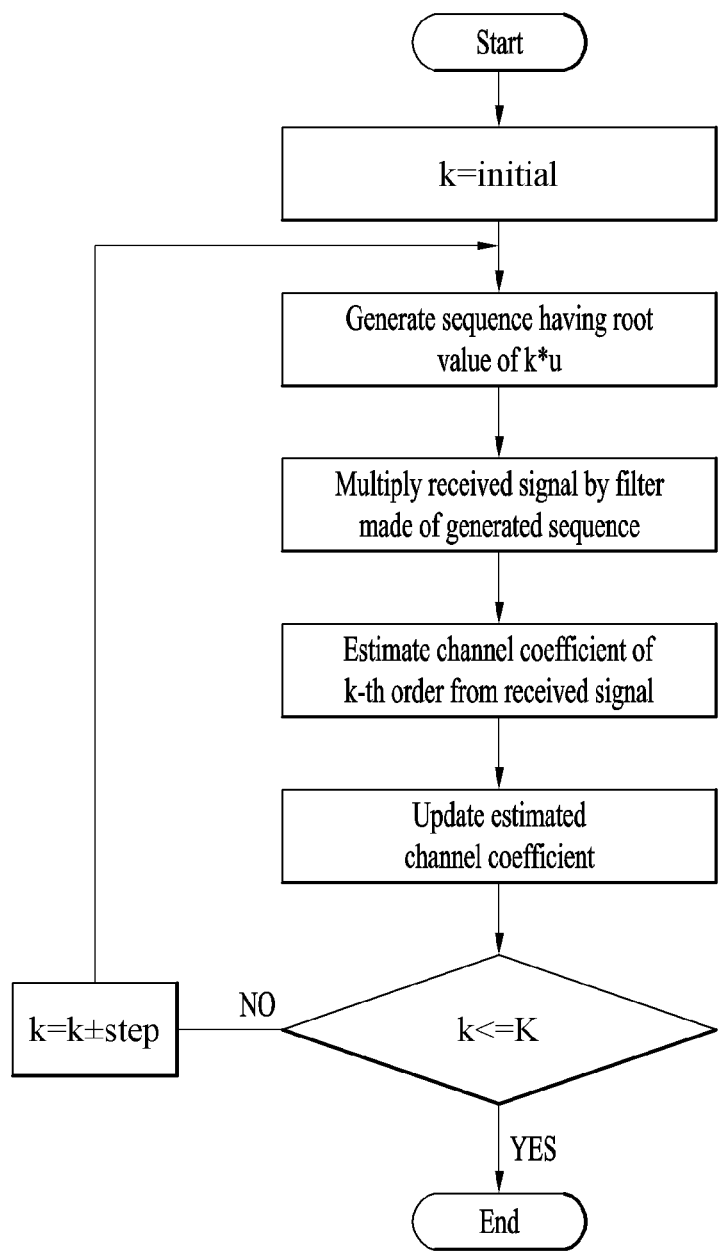
FIG. 11 is a diagram showing, in detail, a procedure for coefficient estimation of a self-interference channel.

FIG. 11 is a diagram showing, in detail, a procedure for coefficient estimation of a self-interference channel.

Here, in one embodiment, an initial value indicating an initially estimated order or term is set to 1. Referring to FIG. 11, a sequence starting from k=initial value (e.g., initial value=1) and having a root value of k*u is generated and a received signal is multiplied by a filter made of the generated sequence. Then, a channel coefficient of a k-th order from the received signal may be estimated. Here, step is set to 1 for channel estimation of in the order other than k=1. If k is less than K (e.g., K=5, 7, 9 or 11), a predetermined value (e.g., step=1) is added such that k becomes 3 and the above process is repeated until k becomes greater than K as a method of generating a sequence having a root value of k*u.

Figure 12:
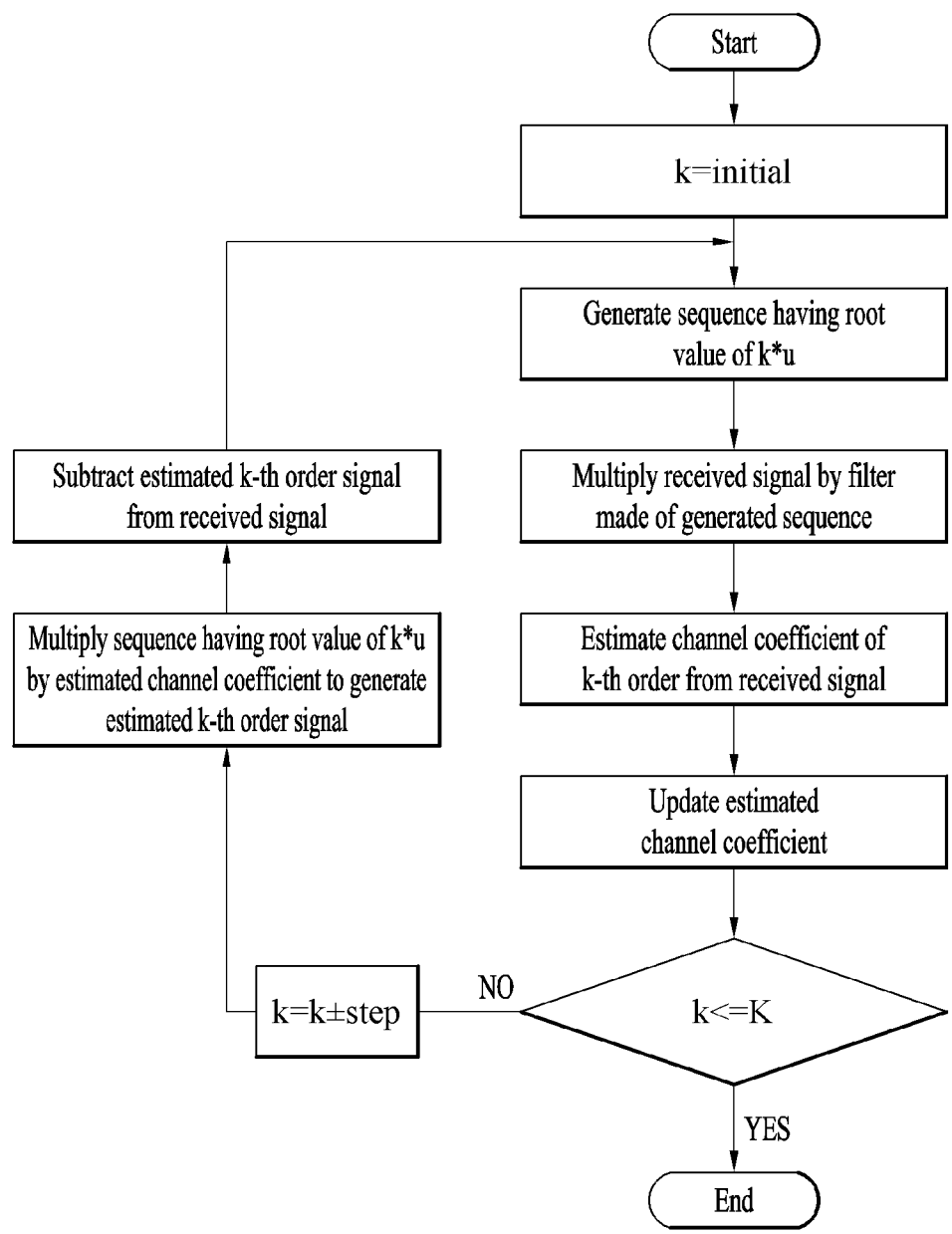
FIG. 12 is a diagram showing, in detail, a procedure for a high-order channel coefficient estimation of a self-interference channel, to which the signal subtraction concept is added.

FIG. 12 is a diagram showing, in detail, a procedure for a high-order channel coefficient estimation of a self-interference channel, to which the signal subtraction concept is added.

Here, in one embodiment, an initial value indicating an initially estimated order or term is set to 1. Referring to FIG. 12, another procedure is added to the procedure of FIG. 11. A process of adding 1 if k is less than K (e.g., K=5, 7 or 9) and then multiplying a sequence having a root value of k*u by an estimated channel coefficient to generate a signal of a k-th order is added. For channel estimation in the order other than k=1, step is set to 1. A process of subtracting the estimated signal of the k-th order from the received signal is added. The above process is repeated until k becomes greater than K again.

<Proposal 7>

For accurate estimation of the self-interference channel coefficient, the root value of the available sequence is determined in consideration of non-linearity of the Tx-chain and the Rx-chain. As described above, in order to perform channel estimation in consideration of non-linearity of the Tx chain and the Rx chain, the root value are set differently from the sequence set used in Proposal 3 above such that the same portions is not generated in the same sequence set.

In the following embodiment, sequence design when Nzc=71 is selected to have the largest value among the above prime numbers and the component of up to a third order is considered in the Tx chain and the Rx chain will be described.

(1) Method of designing Zadoff-Chu sequence for digital self-interference cancellation considering non-linear self-inference component of third order in Tx chain and non-linear self-inference component of third order in Rx chain In order to perform estimation in consideration of the channel coefficient of the third order among self-interference signals, as shown in [Table 13] below, one of a total of 15 sequence sets may be used. At this time, since a difference in root value between sequences contained in an arbitrary sequence set is relatively prime to a sequence length, the cross correlation property of the sequence is satisfied. In addition to [Table 13] below, other embodiments satisfying relative prime are possible.

In addition to [Table 13] below, other embodiments satisfying relative prime are possible. For example, a root value of a $1^{st}$ order of set 1 may become an integer less than Nzc which is not 1 and various table configurations are possible by the above-described sequence set configuration method. [Table 13] below shows an example of a Zadoff-Chu sequence set considering up to a third order.

TABLE 13

| Sequence Set | 1st (u) | 2nd (2u) | 3rd (3u) |
|---|---|---|---|
| Set 1 | 1 | 2 | 3 |
| Set 2 | 4 | 8 | 12 |
| Set 3 | 5 | 10 | 15 |
| Set 4 | 7 | 14 | 21 |
| Set 5 | 9 | 18 | 27 |
| Set 6 | 11 | 22 | 33 |
| Set 7 | 13 | 26 | 39 |
| Set 8 | 16 | 32 | 48 |
| Set 9 | 17 | 34 | 51 |
| Set 10 | 19 | 38 | 57 |
| Set 11 | 20 | 40 | 60 |
| Set 12 | 23 | 46 | 69 |
| Set 13 | 59 | 47 | 35 |
| Set 14 | 62 | 53 | 44 |
| Set 15 | 66 | 61 | 56 |

To this end, the values of [Table 13] above may be implicitly set and a rule for transmitting a root value which may configure the above table through a predefined signal (e.g., a physical layer signal or a higher layer signal) to a transmission side and a reception side using FDR may be defined.

<Proposal 7-1>

A sequence set used through signaling may be changed in order to determine whether to consider non-linearity of an Rx RF chain in consideration of self-interference cancellation performance Whether to consider non-linearity of the Rx RF chain should be determined according to antenna/analog self-interference cancellation performance. For example, if the intensity of a residual self-interference (SI) signal is within a dynamic range of the LNA and VGA due to sufficient antenna/analog self-interference cancellation performance, desired FDR performance can be obtained through channel estimation considering non-linearity of the Tx RF chain through the schemes of <Proposal 1> to <Proposal 6> without considering non-linearity of the Rx RF chain. However, if the intensity of a residual self-interference (SI) signal exceeds the dynamic range of the LNA and VGA due to deterioration of antenna/analog self-interference cancellation performance, non-linearity of the Rx RF chain should be considered. To this end, the intensity of the residual self-interference signal needs to be measured after performing antenna/analog self-interference cancellation and the measurement method will be described with reference to FIG. 13.

Figure 13:
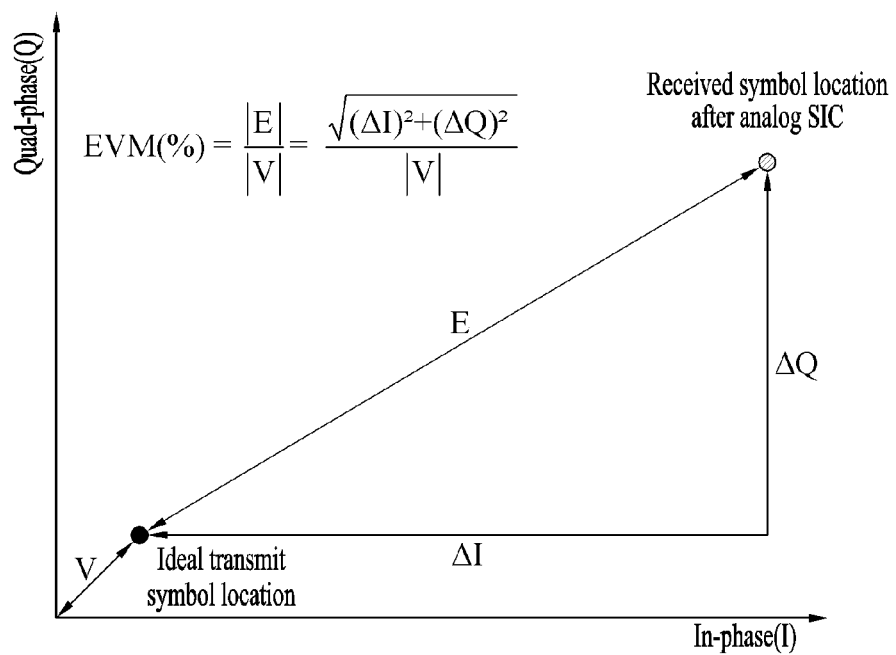
FIG. 13 is a diagram showing an example of an EVM considering a residual self-interference signal.

FIG. 13 is a diagram showing an example of an EVM considering a residual self-interference signal.

First, an error vector magnitude (EVM) is used as a method of measuring a residual self-interference amount of a received signal. The EVM is obtained by dividing a vector difference between a transmitted signal and a received signal by a vector size of the transmitted signal. FIG. 13 shows an example of the EVM considering power of self-interference. In an FDR system, since the transmitted signal is known, the EVM of the received in the digital domain may be calculated and, since the level of the power of the received signal is greater than that of the transmitted signal by several tens of dB or more, the amount of the self-interference signal may be compared therewith.

Channel estimation is used as another method of measuring a self-interference signal amount of each received signal. An effective channel $\hat{h}_{SI,k}(n)=\hat{h}_{SI,k}(n)-\tilde{h}_{SI,k}(n)$ after analog self-interference may be estimated based on a reference signal in the transmitted signal and an absolute amount of residual SI may be measured.

The intensity of the residual self-interference signal after performing antenna/analog self-interference cancellation may be measured using the above method and whether non-linearity of the Rx RF chain is considered is instantaneously determined. To this end, a rule for transmitting a root value which may configure [Table 13] above through a predefined signal (e.g., a physical layer signal (PDCCH, EPDCCH, PUCCH, etc.) or a higher layer signal (an RRC signal, etc.) between devices using FDR such that the sequence sets of <Proposal 1> to <Proposal 6> and the sequence sets of <Proposal 7> are instantaneously changed may be defined.

<Proposal 8>

A method for supporting self-interference channel estimation of multiple users supporting FDR in consideration of non-linearity of the Tx chain and the Rx chain will be described.

In order to minimize interference in consideration of non-linearity of the Tx chain and the Rx chain upon estimation of a high-order channel coefficient of a self-interference channel between multiple users (or UEs) supporting FDR, the sequence sets of Proposal 7 may be grouped and used. The sequence sets of Proposal 7 are sets of sequences for estimating the high-order self-interference channel coefficient in consideration of non-linearity of the Tx chain and the Rx chain. However, inter-sequence interference corresponding to the high order may be generated in the self-interference estimation period between multiple users using the same band upon estimation of the self-interference channel between multiple users. In particular, even in sequences which were not equal upon considering only the Tx chain, an order component acting as interference may be generated upon considering non-linearity of the Rx chain. Therefore, in order to minimize inter-user interference, sequence sets changed according to user (or UE) may be used in consideration of non-linearity of the Tx chain and the Rx chain. At this time, cross correlation between sequence sets may also be considered.

In this proposal, a method of grouping sequence sets which may be used between adjacent users operating in FDR in consideration of non-linearity of the Tx chain and the Rx chain is proposed. Sequence sets, which may maintain low cross correlation, among several sequence sets may be grouped and allocated to multiple adjacent users, thereby minimizing inter-user interference generated by non-linearity of the Tx chain and the Rx chain upon self-interference channel estimation.

<Proposal 8-1>

A physical channel (PDCCH, PUCCH, EPDCCH, etc.) or a higher layer signal (RRC signal) may be used to signal a sequence set and sequence set group available per user.

The following embodiment shows sequence set grouping when Nzc=71 and a component of up to a third-order in the Tx chain and the Rx chain are considered based on the embodiment of Proposal 7 above.

(1) Sequence set grouping method design for supporting multiple users among Zadoff-Chu sequence sets for digital self-interference cancellation design considering non-linear self-interference signal component of third order in Tx chain and non-linear self-interference signal component of third order in Rx chain Upon performing estimation in consideration of a channel coefficient of a third order among self-interference signals, as shown in [Table 12], interference corresponding to several orders is generated. To this end, grouping may be performed so as to maintain low cross correlation between sequences of different groups of 15 sequence sets described in [Table 13]. That is, grouping is performed so as not to generate interference due to the high-order component upon channel coefficient estimation of the first, second and third orders. For example, if the root values of the sequences of the fourth order or higher are equal to those of the sequences of the first, second and third orders, allocation to the other groups is performed. If grouping is performed using the above method, since a difference in root value between sequences contained in an arbitrary sequence set is relatively prime to a sequence length, the low cross correlation property between the sequence is satisfied.

In addition to [Table 14] below, other embodiments satisfying relative prime are also possible. For example, a root value of a $1^{st}$ order of set 1 may become an integer less than Nzc which is not 1 and various table configurations are possible by the above-described sequence set configuration method. [Table 14] below shows an example of a Zadoff-Chu sequence set considering up to a third order.

TABLE 14

| Sequence Set | Sequence Set Group | 1st (u) | 2nd (2u) | 3rd (3u) |
|---|---|---|---|---|
| Set 1 | Group A | 1 | 2 | 3 |
| Set 2 | Group B | 4 | 8 | 12 |
| Set 3 | Group B | 5 | 10 | 15 |
| Set 4 | Group B | 7 | 14 | 21 |
| Set 5 | Group C | 9 | 18 | 27 |
| Set 6 | Group C | 11 | 22 | 33 |
| Set 7 | Group A | 13 | 26 | 39 |
| Set 8 | Group D | 16 | 32 | 48 |
| Set 9 | Group A | 17 | 34 | 51 |
| Set 10 | Group C | 19 | 38 | 57 |
| Set 11 | Group D | 20 | 40 | 60 |
| Set 12 | Group E | 23 | 46 | 69 |
| Set 13 | Group D | 59 | 47 | 35 |
| Set 14 | Group F | 62 | 53 | 44 |
| Set 15 | Group B | 66 | 61 | 56 |

To this end, the values of [Table 14] above may be implicitly set, and a rule for transmitting a root value which may configure the above table through a predefined signal (e.g., a physical layer signal or a higher layer signal) to a transmission side and a reception side using FDR may be defined.

The reason why the group is configured as [Table 14] above will be described through the table shown in FIG. 14. FIG. 14 shows a table for an embodiment of a Zadoff-Chu sequence set considering a third order.

The same hatching shape of FIG. 14 is a root value used in the same sequence set group and a method of configuring different sequence set groups such that sequences used in fourth to ninth orders are not used in first to third orders will now be described.

(2) When a sequence set available per user is allocated, a sequence set group can be confirmed through an existing mapping table. Since a unique sequence set group may be determined according to sequence set, when devices (base station/UE) using an FDR scheme share the table shown in FIG. 14, the sequence set group can be confirmed using the allocated sequence set. In addition, in the case where the number of UEs is small, when a sequence set group is allocated in order to reduce a feedback amount, sequence sets in the same group may be arbitrarily determined and used and blind estimation may be performed using several sequence sets in the sequence set group.

Method of using IDFT-DFT in order to reduce the effects of interference upon self-interference channel estimation of multiple users supporting FDR in consideration of non-linearity of the Tx chain and the Rx chain In Equation 11 and Equation 13 above, the self-interference channel coefficient value corresponding to each order is estimated through the cross correlation property of the sequence in the time domain. However, performance may be restricted due to noise caused by cross correlation with different sequences.

In digital self-interference cancellation, a residual self-interference signal is determined according to estimation performance of the self-interference channel and is significantly influenced by very small channel estimation errors. Therefore, there is a need for a channel estimation scheme for more accurate channel estimation. In the present invention, a method of obtaining more accurate channel estimation performance by applying a transform domain based channel estimation scheme will be described.

<Proposal 9>

In order to improve accuracy of high-order self-interference channel coefficient estimation in an FDR UE, interference may be suppressed through an IDFT-DFT process.

A signal obtained by multiplying a signal by a matched filter $s^*_{ku}[n]$ made based on a sequence $S_{ku}[n]$ having a root value of $k^*u$ is expressed as shown in Equation 23 below.

$$a_{ku}[n]=s^*_{ku}[n]y_u[n], a_{ku}^{SIC}[n]=s^*_{ku}[n]y_u^{SIC}[n]. \quad \text{[Equation 23]}$$

When the sequence in the time domain is subjected to DFT, a sequence in the frequency domain may be expressed as shown in Equation 24 below.

$$A_{ku}[m] = \frac{1}{\sqrt{N}}\sum_{n=0}^{N-1} a_{ku}[n]e^{-j\frac{2\pi nm}{N}},$$

$$A_{ku}^{SIC}[m] = \frac{1}{\sqrt{N}}\sum_{n=0}^{N-1} a_{ku}^{SIC}[n]e^{-j\frac{2\pi nm}{N}} \quad \text{[Equation 24]}$$

where, N denotes a DFT size.

In order to cancel interference from the sequence obtained in Equation 24, a component of an a-th order among some frequency portions is subjected to zero forcing. The sequence after performing zero forcing is expressed as shown in Equation 25 below.

$$A_{ku}^{ZP}[m]=A_{ku}[m]1_a[m], A_{ku}^{ZP,SIC}[m]=A_{ku}^{ZP}[m]1_a[m]. \quad \text{[Equation 25]}$$

where, $1_a[m]$ is a function having a value of 1 in the case of m≤a and a function having a value of 0 in the case of m>a.

When the sequence in the frequency domain is subjected to IDFT, the sequence in the time domain may be expressed as shown in Equation 26 below.

$$a_{ku}^{ZF}[n] = \frac{1}{\sqrt{N}}\sum_{m=0}^{N-1} A_{ku}^{ZF}[m]e^{j\frac{2\pi nm}{N}}, \quad \text{[Equation 26]}$$

$$a_{ku}^{ZF,SIC}[n] = \frac{1}{\sqrt{N}}\sum_{m=0}^{N-1} A_{ku}^{ZF,SIC}[m]e^{j\frac{2\pi nm}{N}}$$

A portion other than the component to be obtained in the sequence obtained in Equation 26 may be partially removed through the above process. The sequence changed through the above process is as shown in FIG. 15.

Figure 15:
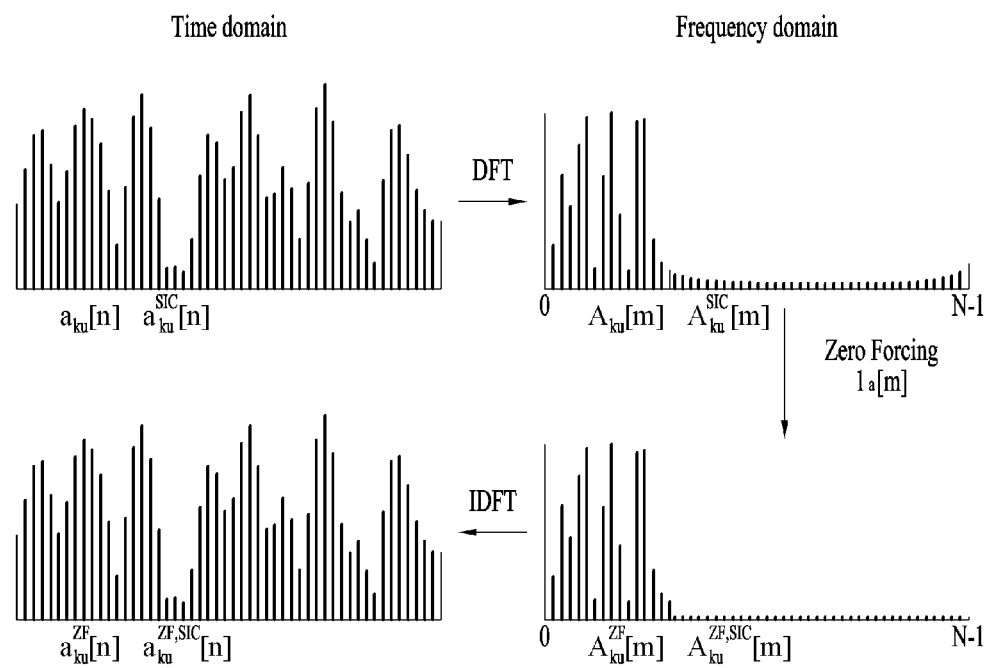
FIG. 15 is a diagram showing a detailed process of a scheme proposed by proposal 9 and effects thereof.
Figure 16:
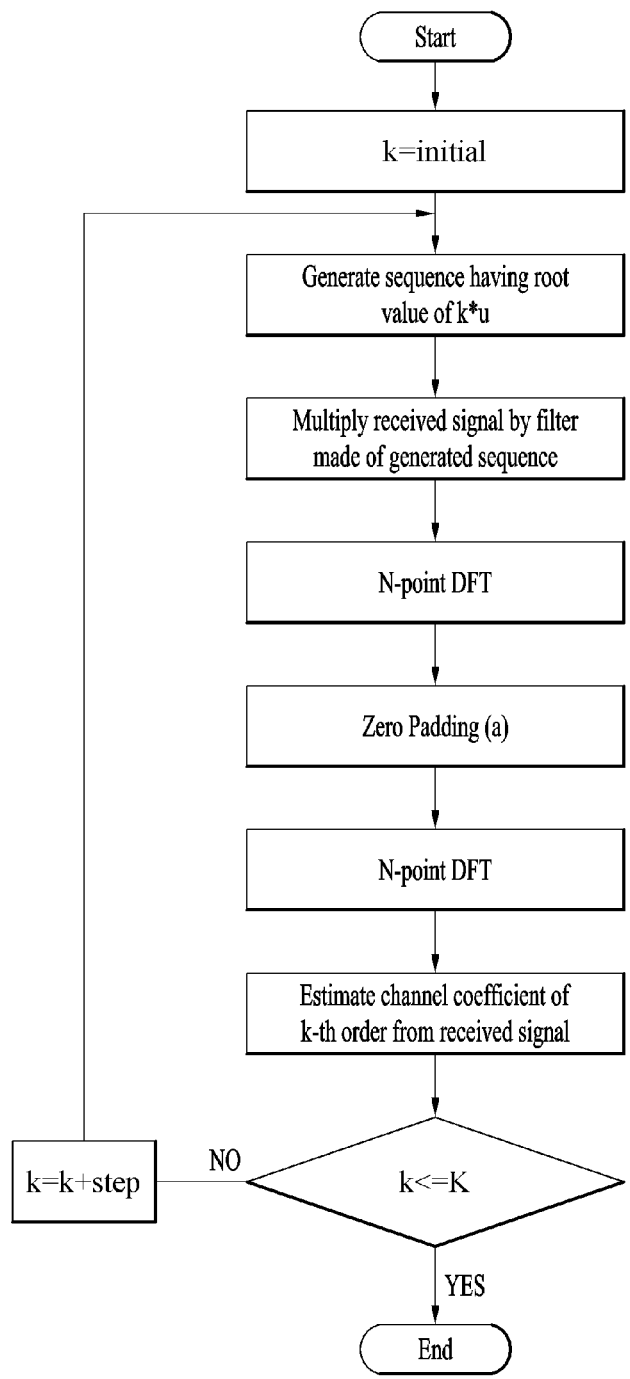
FIG. 16 is a diagram showing a detailed procedure of coefficient estimation of a self-interference channel based on DFT.
Figure 17:
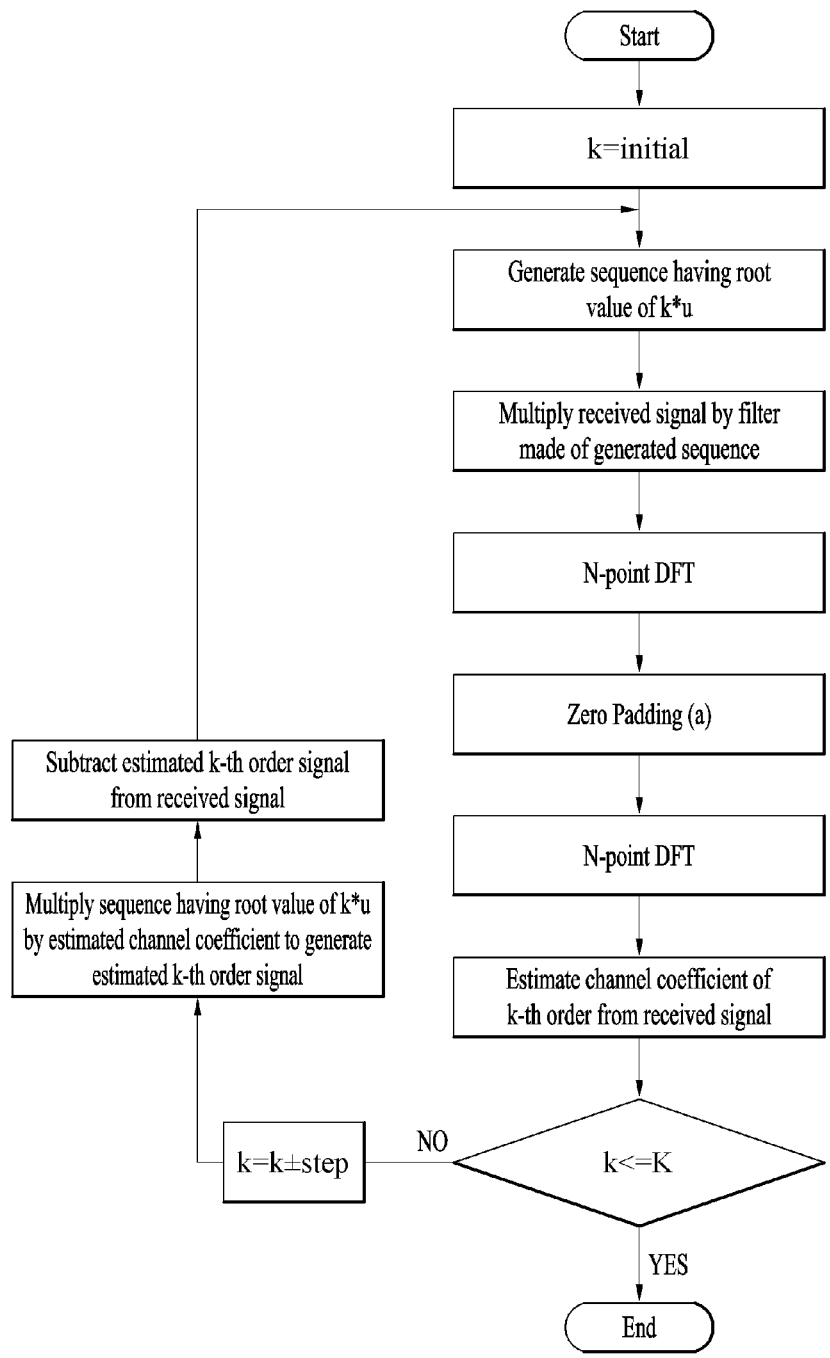
FIG. 17 is a diagram showing a detailed procedure of coefficient estimation of a high-order channel of a self-interference channel, to which the DFT-based signal subtraction concept is added.

FIG. 15 is a diagram showing a detailed process of a scheme proposed by proposal 9 and effects thereof, and FIGS. 16 and 17 are diagrams showing the process shown in FIG. 15 based on FIGS. 7 and 8.

FIG. 16 is a diagram showing a detailed procedure of coefficient estimation of a self-interference channel based on DFT.

In FIG. 16, an initial value indicating an initially estimated order is set to 1 and step is set to 1 for channel estimation of the other orders.

Referring to FIG. 16, a sequence starting from k=initial value (e.g., initial value=1) and having a root value of k*u is generated and a received signal is multiplied by a filter made of the generated sequence. As described above, step is set to 1. Then, N-point DFT is performed, zero padding is performed, and then N-point IDFT is performed. Thereafter, a channel coefficient of a k-th order from the received signal may be estimated. If k is less than K (e.g., K=5, 7, 9 or 11), a predetermined value (e.g., step=1) is added such that k becomes 2 and the above process is repeated until k becomes greater than K, as a method of generating a sequence having a root value of k*u.

FIG. 17 is a diagram showing a detailed procedure of coefficient estimation of a high-order channel of a self-interference channel, to which the DFT-based signal subtraction concept is added.

In FIG. 17, in one embodiment, an initial value indicating an initially estimated order is set to 1 and step is set to 1 for channel estimation of the other orders. In Equations 24 to 26 above, the special case having m=0 in the present methods is equal to the methods of Proposals 1 and 2.

In FIG. 17, another procedure is added to the procedure of FIG. 16. A process of adding 1 if k is less than K (e.g., K=5, 7 or 9) and then multiplying a sequence having a root value of k*u by an estimated channel coefficient to generate a signal of a k-th order is added. As described above, for self-interference channel estimation, step is set to 1. A process of subtracting an estimated signal of a k-th order from the received signal is added. The above process is repeated until k becomes greater than K again.

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method of estimating a non-linear self-interference signal channel by an apparatus using an FDR scheme is industrially applicable to various wireless communication systems such as a 3GPP LTE/LTE-A system or a 5G communication system.

The invention claimed is:

1. A method of estimating a non-linear self-interference signal channel by an apparatus using a full-duplex radio (FDR) scheme, the method comprising:
    measuring an intensity of a residual self-interference signal after antenna self-interference cancellation and analog self-interference cancellation;
    determining whether a self-interference signal component in a radio frequency (RF) reception (Rx) chain of the apparatus is non-linear;
    estimating the non-linear self-interference signal channel using a first sequence set included in a predefined first sequence group if the self-interference signal component in the RF Rx chain of the apparatus is non-linear;
    estimating the non-linear self-interference signal channel using a second sequence set included in a predefined second sequence group if the self-interference signal component in the RF Rx chain is not non-linear,
    wherein the predefined first sequence group is defined in consideration of a non-linear self-interference signal component in an RF transmission (Tx) chain and an RF Rx chain, and
    wherein the predefined second sequence group is defined in consideration of only a non-linear self-interference signal component of the RF Tx chain among non-linear self-interference signal components in the RF Tx chain and the RF Rx chain.

2. The method according to claim 1, wherein a difference in root value between sequences included in the first sequence set is relatively prime to a sequence length.

3. The method according to claim 1, further comprising receiving information on root values capable of configuring the predefined first sequence group.

4. The method according to claim 3, wherein information on the root values is received through a physical layer signal or a higher layer signal.

5. The method according to claim 1, further comprising:
receiving sequence set group information including the second sequence set capable of being used by the apparatus among the sequence sets included in the predefined first sequence group.

6. The method according to claim 1, further comprising receiving sequence set group information including the first sequence set capable of being used by the apparatus among the sequence sets included in the predefined first sequence group.

7. The method according to claim 6, wherein the sequence set group information is received through a physical downlink control channel (PDCCH), a physical uplink control channel (PUCCH), or an enhanced physical downlink control channel (EPDCCH).

8. A apparatus for estimating a non-linear self-interference signal channel in a full-duplex radio (FDR) environment, the apparatus comprising:
a processor configured to:
measure an intensity of a residual self-interference signal after antenna self-interference cancellation and analog self-interference cancellation;
determine whether a self-interference signal component in a radio frequency (RF) reception (Rx) chain of the apparatus is non-linear;
estimate the non-linear self-interference signal channel using a first sequence set included in a predefined first sequence group if the self-interference signal component in the RF Rx chain of the apparatus is non-linear;
estimate the non-linear self-interference signal channel using a second sequence set included in a predefined second sequence group if the self-interference signal component in the RF Rx chain is not non-linear,
wherein the predefined first sequence group is defined in consideration of non-linear self-interference signal component in an RF transmission (Tx) chain and an RF Rx chain, and wherein the predefined second sequence group is defined in consideration of only a non-linear self-interference signal component of the RF Tx chain among non-linear self-interference signal components in the RF Tx chain and the RF Rx chain.

9. The apparatus according to claim 8, wherein a difference in root value between sequences included in the first sequence set is relatively prime to a sequence length.

10. The apparatus according to claim 8, further comprising:
a receiver configured to receive information on root values capable of configuring the predefined first sequence group.

11. The apparatus according to claim 10, wherein the receiver is configured to receive information on the root values through a physical layer signal or a higher layer signal.

12. The apparatus according to claim 8, further comprising:
a receiver to receive sequence set group information including the second sequence set capable of being used by the apparatus among the sequence sets included in the predefined first sequence group.

13. The apparatus according to claim 8, further comprising:
a receiver to receive sequence set group information including the first sequence set capable of being used by the device among the sequence sets included in the predefined first sequence group.

14. The apparatus according to claim 13, wherein the receiver receives the sequence set group information through a physical downlink control channel (PDCCH), a physical uplink control channel (PUCCH), or an enhanced physical downlink control channel (EPDCCH).

* * * * *